US008660872B1

(12) United States Patent
Sedota, Jr. et al.

(10) Patent No.: US 8,660,872 B1
(45) Date of Patent: Feb. 25, 2014

(54) SYSTEMS AND METHOD FOR PRIORITIZING REAL ESTATE OPPORTUNITIES IN A LEAD HANDLING SYSTEM BASED ON LEAD QUALITY AND OPPORTUNITY SCORES

(71) Applicant: BoomTown, LLC, Charleston, SC (US)

(72) Inventors: Donald James Sedota, Jr., Mount Pleasant, SC (US); Cooper Howard Bane, Charleston, SC (US); Elliott Grier Allen, Mount Pleassant, SC (US); Andrew Abraham McGuier, North Charleston, SC (US); Bryan Christopher Green, Goose Creek, SC (US)

(73) Assignee: Boomtown, LLC, Charleston, SC (US)

( * ) Notice: Subject to any disclaimer, the term of this patent is extended or adjusted under 35 U.S.C. 154(b) by 0 days.

(21) Appl. No.: 13/752,750

(22) Filed: Jan. 29, 2013

Related U.S. Application Data

(63) Continuation of application No. 13/734,135, filed on Jan. 4, 2013.

(60) Provisional application No. 61/715,676, filed on Oct. 18, 2012.

(51) Int. Cl.
G06Q 10/00 (2012.01)
(52) U.S. Cl.
USPC ....................................................... 705/7.11
(58) Field of Classification Search
USPC ....................................................... 705/7.11
See application file for complete search history.

(56) References Cited

U.S. PATENT DOCUMENTS

| | | | | |
|---|---|---|---|---|
| 5,627,973 | A * | 5/1997 | Armstrong et al. | 705/7.32 |
| 5,930,764 | A * | 7/1999 | Melchione et al. | 705/7.29 |
| 6,078,892 | A * | 6/2000 | Anderson et al. | 705/7.33 |
| 6,236,977 | B1 * | 5/2001 | Verba et al. | 705/7.32 |
| 6,286,005 | B1 | 9/2001 | Cannon | |
| 6,334,110 | B1 | 12/2001 | Walter et al. | |
| 6,772,129 | B2 | 8/2004 | Alvarez et al. | |
| 6,848,542 | B2 | 2/2005 | Galley et al. | |
| 6,850,252 | B1 | 2/2005 | Hoffberg | |

(Continued)

FOREIGN PATENT DOCUMENTS

WO    WO 2006/110873 A2 * 10/2006 ............... G06F 15/18

OTHER PUBLICATIONS

Precept Marketing Introduces First Sales Opportunity Management Program Business Wire, Jun. 19, 2000.*

(Continued)

*Primary Examiner* — Scott L Jarrett
(74) *Attorney, Agent, or Firm* — Morris, Manning & Martin, LLP; Daniel E. Sineway, Esq.

(57) ABSTRACT

Systems and methods for facilitating identification and prioritization of opportunities for marketers of goods and services. According to one aspect of the disclosed system, upon identification of one or more opportunities for a marketer, the system verifies whether or not the one or more opportunities satisfy certain preexisting threshold criteria. Those opportunities that satisfy certain preexisting threshold criteria are then scored, prioritized and presented to marketers. The disclosed system generates opportunity scores by analyzing various kinds of lead- and non-lead-based information and data. Aspects of the disclosed system are communicably coupled to marketers, leads, and third party information services to extract such information and data.

14 Claims, 13 Drawing Sheets

OVERVIEW OF EXEMPLARY LEAD HANDLING SYSTEM (LHS) ENVIRONMENT

(56) References Cited

U.S. PATENT DOCUMENTS

| | | | |
|---|---|---|---|
| 6,850,895 B2* | 2/2005 | Brodersen et al. | 705/7.14 |
| 6,868,389 B1* | 3/2005 | Wilkins et al. | 705/7.29 |
| 7,031,932 B1 | 4/2006 | Lipsky et al. | |
| 7,035,699 B1* | 4/2006 | Anderson et al. | 700/90 |
| 7,047,206 B1* | 5/2006 | Schultze | 705/7.15 |
| 7,158,943 B2 | 1/2007 | van der Riet | |
| 7,194,420 B2* | 3/2007 | Ikezawa et al. | 705/7.25 |
| 7,340,410 B1* | 3/2008 | Vaillancourt et al. | 705/7.15 |
| 7,376,603 B1* | 5/2008 | Mayr et al. | 705/35 |
| 7,424,439 B1 | 9/2008 | Fayyad et al. | |
| 7,426,533 B2 | 9/2008 | Malone et al. | |
| 7,505,572 B2 | 3/2009 | McCullough et al. | |
| 7,546,243 B2* | 6/2009 | Kapadia et al. | 705/1.1 |
| 7,747,545 B2* | 6/2010 | Gleim et al. | 706/8 |
| 7,752,236 B2* | 7/2010 | Williams et al. | 707/804 |
| 7,873,535 B2 | 1/2011 | Umblijs et al. | |
| 7,899,715 B2* | 3/2011 | Zamani | 705/26.3 |
| 7,904,337 B2 | 3/2011 | Morsa | |
| 7,949,563 B2 | 5/2011 | Collins | |
| 7,996,255 B1* | 8/2011 | Shenoy et al. | 705/7.31 |
| 8,027,871 B2* | 9/2011 | Williams et al. | 705/7.31 |
| 8,027,875 B2 | 9/2011 | Harper | |
| 8,108,763 B2 | 1/2012 | Gao et al. | |
| 8,121,883 B2* | 2/2012 | Johnson et al. | 705/7.27 |
| 8,135,607 B2* | 3/2012 | Williams et al. | 705/7.31 |
| 8,255,270 B2* | 8/2012 | Rose et al. | 705/7.36 |
| 8,271,313 B2* | 9/2012 | Williams et al. | 705/7.11 |
| 8,315,904 B2 | 11/2012 | Black et al. | |
| 8,326,964 B1 | 12/2012 | Chourey et al. | |
| 8,386,310 B2 | 2/2013 | Weyer et al. | |
| 8,438,059 B2 | 5/2013 | Bohannon et al. | |
| 2002/0026356 A1* | 2/2002 | Bergh et al. | 705/14 |
| 2002/0026359 A1 | 2/2002 | Long et al. | |
| 2002/0035504 A1* | 3/2002 | Dver et al. | 705/10 |
| 2002/0059095 A1* | 5/2002 | Cook | 705/10 |
| 2002/0077998 A1* | 6/2002 | Andrews et al. | 707/1 |
| 2002/0082892 A1* | 6/2002 | Raffel et al. | 705/8 |
| 2002/0099605 A1 | 7/2002 | Weitzman et al. | |
| 2002/0111847 A1 | 8/2002 | Smith, II | |
| 2002/0133427 A1* | 9/2002 | Shu | 705/26 |
| 2002/0138334 A1* | 9/2002 | DeCotiis et al. | 705/10 |
| 2002/0169835 A1 | 11/2002 | Paul, Jr. et al. | |
| 2003/0023598 A1 | 1/2003 | Janakiraman et al. | |
| 2003/0149672 A1* | 8/2003 | Laskoski | 705/400 |
| 2003/0163343 A1 | 8/2003 | Meiser et al. | |
| 2003/0167195 A1* | 9/2003 | Fernandes et al. | 705/8 |
| 2003/0182175 A1* | 9/2003 | Buie et al. | 705/10 |
| 2003/0220805 A1* | 11/2003 | Hoffman et al. | 705/1 |
| 2003/0229504 A1* | 12/2003 | Hollister | 705/1 |
| 2004/0122735 A1 | 6/2004 | Meshkin | |
| 2004/0143473 A1* | 7/2004 | Tivey et al. | 705/8 |
| 2004/0143476 A1* | 7/2004 | Kapadia et al. | 705/9 |
| 2004/0143484 A1* | 7/2004 | Kapadia et al. | 705/10 |
| 2004/0165221 A1* | 8/2004 | Motohashi et al. | 358/442 |
| 2005/0044036 A1* | 2/2005 | Harrington et al. | 705/38 |
| 2005/0108103 A1* | 5/2005 | Roberts et al. | 705/26 |
| 2005/0137968 A1* | 6/2005 | Mitchell | 705/38 |
| 2005/0261951 A1* | 11/2005 | Tighe | 705/10 |
| 2006/0080229 A1* | 4/2006 | Masella et al. | 705/38 |
| 2006/0089847 A1* | 4/2006 | Dale-Thiebout | 705/1 |
| 2006/0143071 A1* | 6/2006 | Hofmann | 705/8 |
| 2006/0184421 A1 | 8/2006 | Lipsky et al. | |
| 2006/0190107 A1 | 8/2006 | Kassar et al. | |
| 2006/0195338 A1* | 8/2006 | Seibel et al. | 705/1 |
| 2006/0200308 A1* | 9/2006 | Arutunian | 701/208 |
| 2007/0027746 A1* | 2/2007 | Grabowich | 705/10 |
| 2007/0112614 A1 | 5/2007 | Maga et al. | |
| 2007/0157229 A1 | 7/2007 | Heathcock | |
| 2007/0192279 A1 | 8/2007 | Van Luchene | |
| 2007/0226048 A1* | 9/2007 | Vaillancourt et al. | 705/10 |
| 2007/0233559 A1* | 10/2007 | Golec | 705/14 |
| 2007/0233561 A1 | 10/2007 | Golec | |
| 2007/0255621 A1 | 11/2007 | Mason | |
| 2008/0021813 A1 | 1/2008 | Simpson et al. | |
| 2008/0033784 A1 | 2/2008 | Chalimadugu et al. | |
| 2008/0033809 A1 | 2/2008 | Black et al. | |
| 2008/0162487 A1* | 7/2008 | Richter | 707/10 |
| 2008/0215426 A1 | 9/2008 | Guldimann et al. | |
| 2008/0228544 A1* | 9/2008 | Woosley et al. | 705/8 |
| 2009/0018888 A1* | 1/2009 | Zamani et al. | 705/8 |
| 2009/0018894 A1 | 1/2009 | Zamani et al. | |
| 2009/0018928 A1 | 1/2009 | Zamani | |
| 2009/0048859 A1* | 2/2009 | McCarthy et al. | 705/1 |
| 2009/0248485 A1 | 10/2009 | Minow et al. | |
| 2009/0299835 A1 | 12/2009 | Greenbaum et al. | |
| 2010/0131356 A1 | 5/2010 | Stevens et al. | |
| 2010/0324965 A1* | 12/2010 | Croix et al. | 705/9 |
| 2010/0332290 A1* | 12/2010 | Narvaez et al. | 705/10 |
| 2010/0332291 A1* | 12/2010 | Smith | 705/10 |
| 2011/0029375 A1 | 2/2011 | Mason | |
| 2011/0060642 A1* | 3/2011 | Davis et al. | 705/14.41 |
| 2011/0125592 A1 | 5/2011 | Mesaros | |
| 2011/0184875 A1* | 7/2011 | Wilson et al. | 705/313 |
| 2011/0184876 A1 | 7/2011 | Wilson et al. | |
| 2011/0238456 A1* | 9/2011 | Ray et al. | 705/7.13 |
| 2011/0246270 A1 | 10/2011 | Krywolt | |
| 2011/0258016 A1* | 10/2011 | Barak et al. | 705/7.29 |
| 2011/0288962 A1* | 11/2011 | Rankin et al. | 705/27.1 |
| 2011/0289009 A1* | 11/2011 | Rankin et al. | 705/313 |
| 2012/0004983 A1 | 1/2012 | Borthwick et al. | |
| 2012/0030054 A1* | 2/2012 | Zamani | 705/26.3 |
| 2012/0035957 A1 | 2/2012 | Hanz et al. | |
| 2012/0042025 A1 | 2/2012 | Jamison et al. | |
| 2012/0179476 A1* | 7/2012 | Muncy | 705/1.1 |
| 2012/0304207 A1 | 11/2012 | Hughes et al. | |
| 2012/0324025 A1* | 12/2012 | Adams, III | 709/206 |
| 2013/0046581 A1* | 2/2013 | Onder et al. | 705/7.32 |
| 2013/0054309 A1* | 2/2013 | Rose et al. | 705/7.36 |
| 2013/0066712 A1 | 3/2013 | Umeda | |
| 2013/0085805 A1* | 4/2013 | Kursar et al. | 705/7.29 |

OTHER PUBLICATIONS

Marketsoft.com—eLeads Marketsoft, Feb. 2000, Retrieved from Archive.org Jun. 22, 2006.*
Anchor Launches LeadVerifier: To Verify, Correct and Enhance Leads Jul. 19, 2005.*
LeadTrack.com Web Pages LeadTrack Software, Feb. 2001, Retrieved from Archive.org Nov. 5, 2007.*
LeadMaster.com Web Pages LeadMaster, Dec. 2000, Retrieved from Archive.org Jan. 8, 2006.*
Wortman, Leon A., Keeping track with the Mac Business Marketing, Jan. 1991.*
Griggs, Robyn, Give us leads! Give us leads! Sales and Marketing Management, vol. 149, No. 7, Jul. 1997.*
Bergh et al., U.S. Appl. No. 09/575,283 Incorporated by reference into U.S. Patent Publication No. 2002/0026356.*
Hill, Josh, Marketing Rockstar's Guide to Marketo—How to build a lead scoring system Marketing Rockstar Guides, LLC., 2012.*
The Definitive Guide to Lead Scoring—A Marketo Workbook Marketo, 2010.*
Top Producer 7i—User Guide Top Producer Systems, 2007.*
LeadPro24/7—Lead Management and Email Marketing System Anagha Group, 2010.*
LeadPro247.com Web Pages Anagha Group, Feb. 2011, Retrieved from Archive.org Jul. 19, 2013.*
Marketing to Mobile Customers Preparation Guide 10Point, Realtor.com, 2011.*
Real Estate Lead Management BoomerranLead, Nov. 22, 2011.*
My Listings, My Leads—Guiding You Through Our Lead Management Solutions Keller Williams, Nov. 2007.*
LeadPro 24/7—Lead Management & Email Marketing System LeadPro247.com, Anagha Group, May 3, 2010.*
Andre, Stephanie, Mobile Lead Generation Meets Mobile Lead Management—Realtor.com and Top Producer Mobilze the Marketplace, RISMedia, Oct. 19, 2010.*
Move Rolls Out Top Producer iPhone App Imman News, Sep. 9, 2010.*
Move Unveils New Top Product 8i iPhone App—Realtors have infield power in their pocket PRNewswire, Sep. 9, 2010.*

(56) References Cited

OTHER PUBLICATIONS

Re/Max of Indiana Integrages Top Producer 8i into LeadStreet System PRNewswire, Dec. 22, 2010.*

Northam, Eric, Real Estate Software Reviews EasyBroker, Oct. 20, 2009.*

RealtyMX.com Web Pages—Real Estate Lead Management RealtyMX, May 22, 2011, Retrieved from Archive.org, Jul. 19, 2013.*

Review of Real Estate Mobile Applications for the Consumer Clareity Consulting, Jun. 28, 2010.*

Top Producer Systems and DriveBuy Technologies annouce integration DriveBuyTech.com, Apr. 22, 2008.*

TopProducer and Your Virtual Assistant: Managing Your Leads Revats, Aug. 23, 2009.*

LeadPro247.com Web Pages—Automated Lead Distribution, Lead Tracking, Lead Management and Online Surveys LeadPro247, Feb. 19, 2011, Retrieved from Archive.org, Jul. 19, 2013.*

Agent360.net—Web Pages RENWare, LLC, Aug. 2006, Retrieved from Archive.org Oct. 1, 2013.*

BoomTownRoi.com—Web Pages BoomTown, Mar. 2008, Retrieved from Archive.org Oct. 1, 2013.*

* cited by examiner

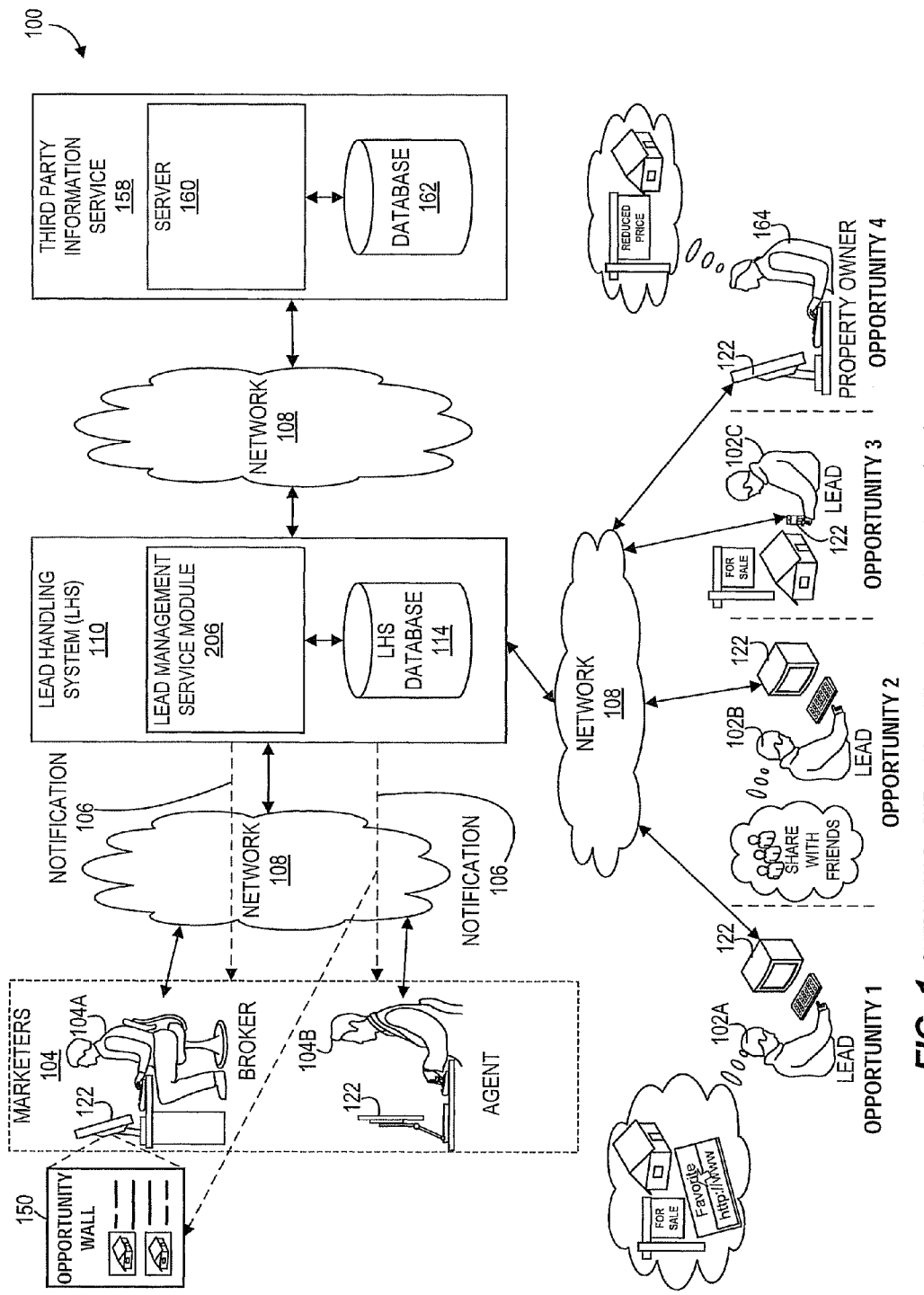
FIG. 1 OVERVIEW OF EXEMPLARY LEAD HANDLING SYSTEM (LHS) ENVIRONMENT

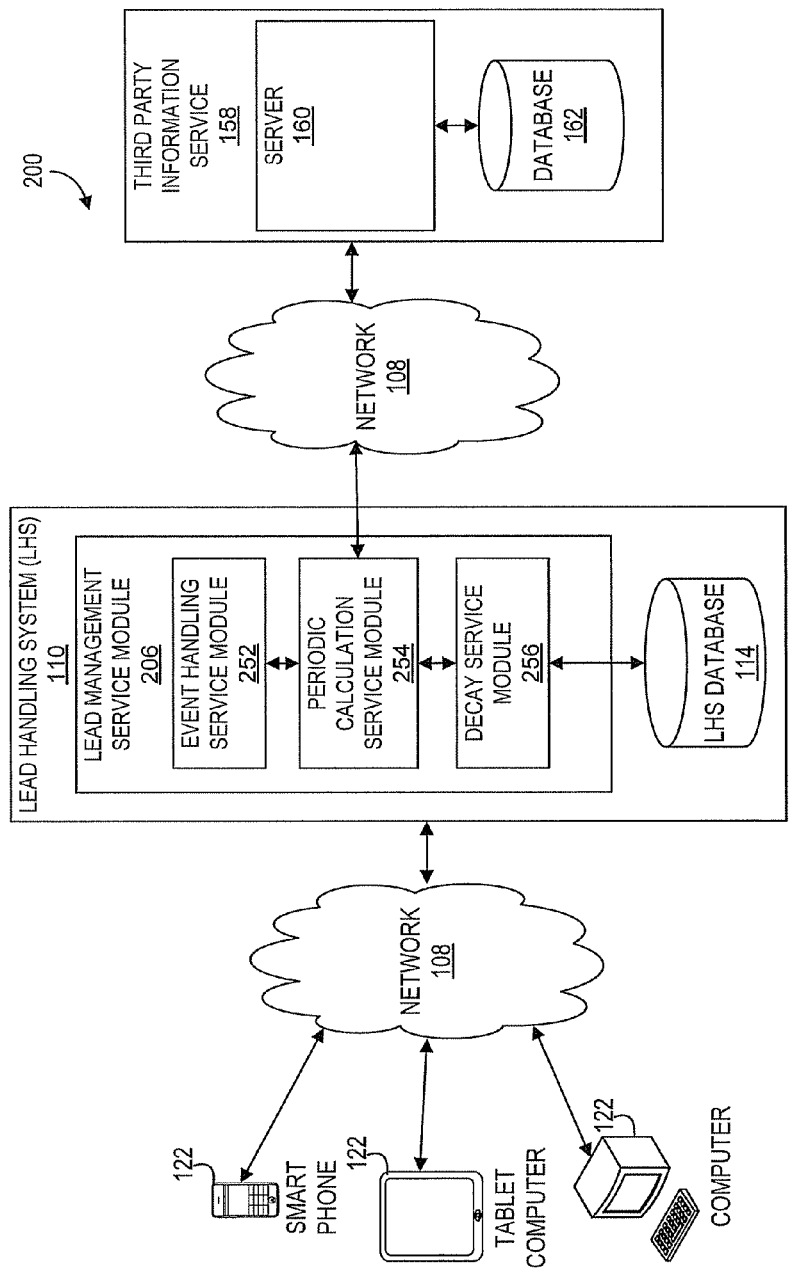
FIG. 2 EXEMPLARY LEAD HANDLING SYSTEM ARCHITECTURE

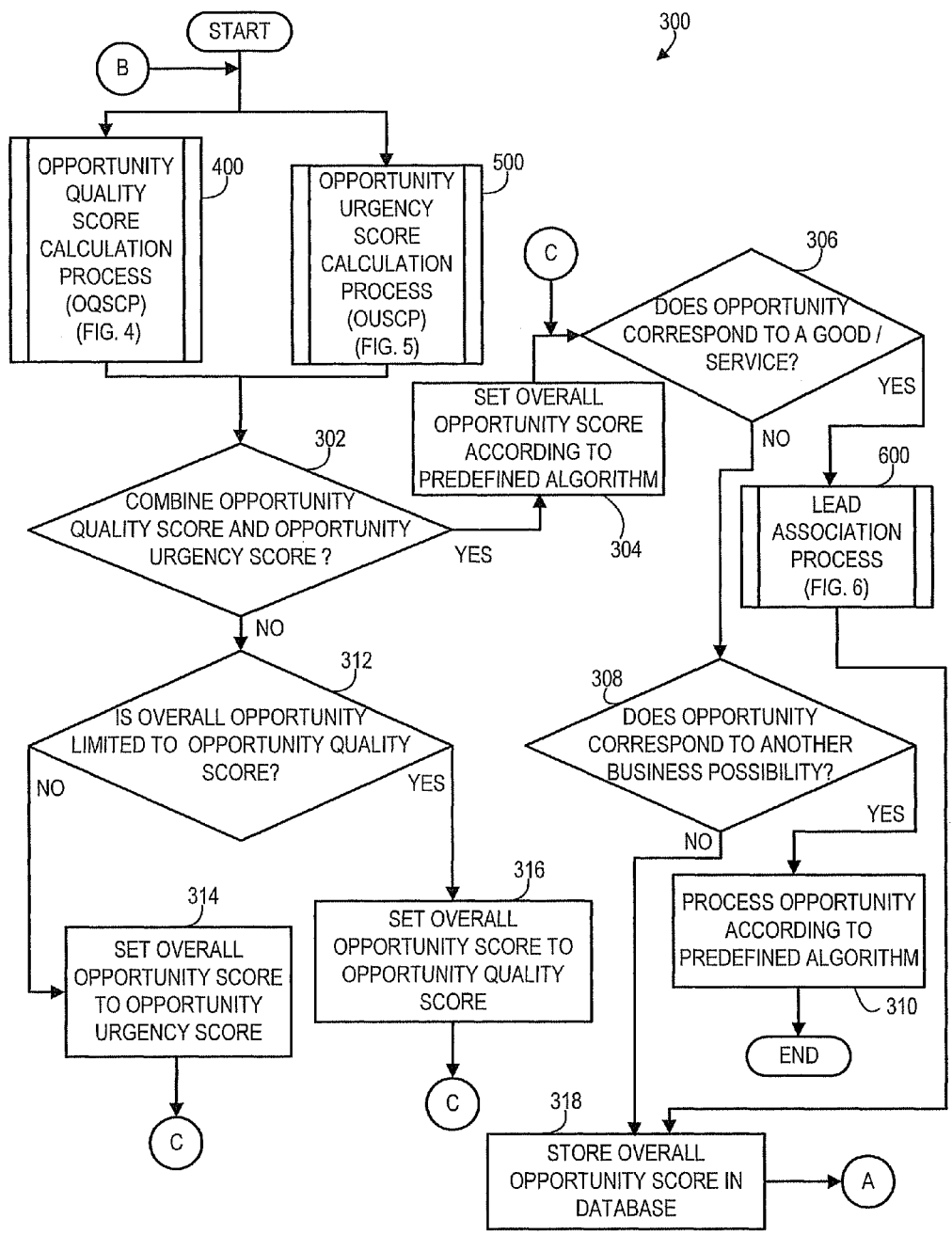
FIG. 3A *EXEMPLARY OPPORTUNITY IDENTIFICATION AND PRIORITIZATION PROCESS (OIPP)*

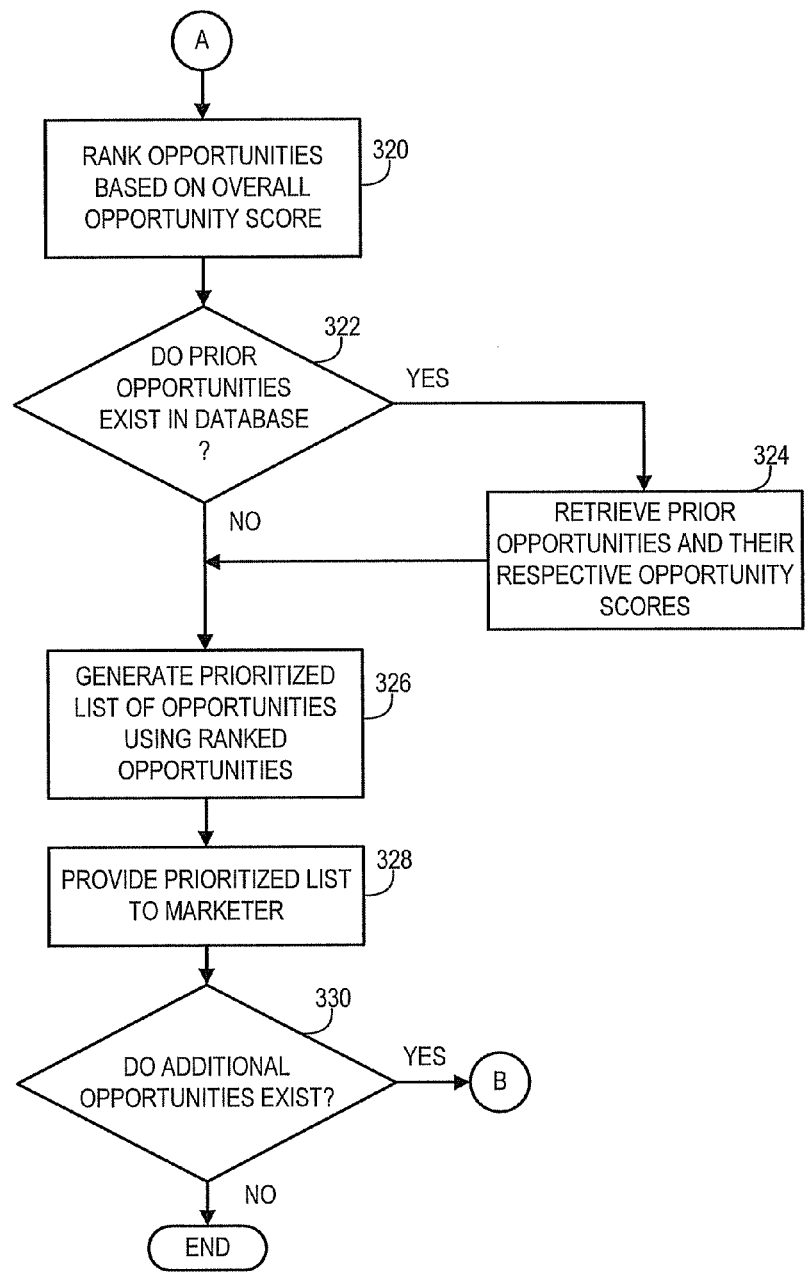
FIG. 3B *EXEMPLARY OPPORTUNITY IDENTIFICATION AND PRIORITIZATION PROCESS (OIPP)*

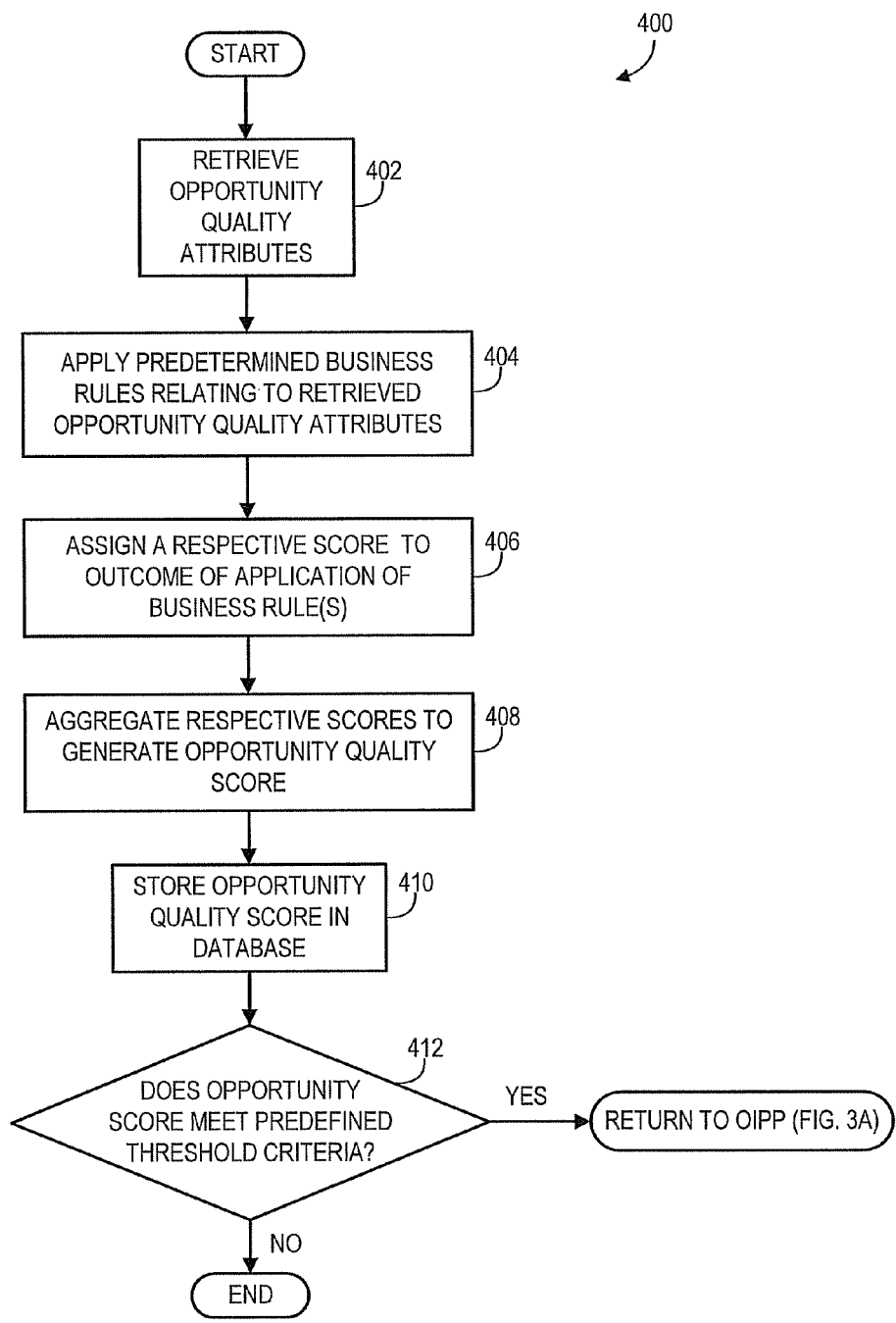
FIG. 4 EXEMPLARY OPPORTUNITY QUALITY SCORE CALCULATION PROCESS (OQSCP)

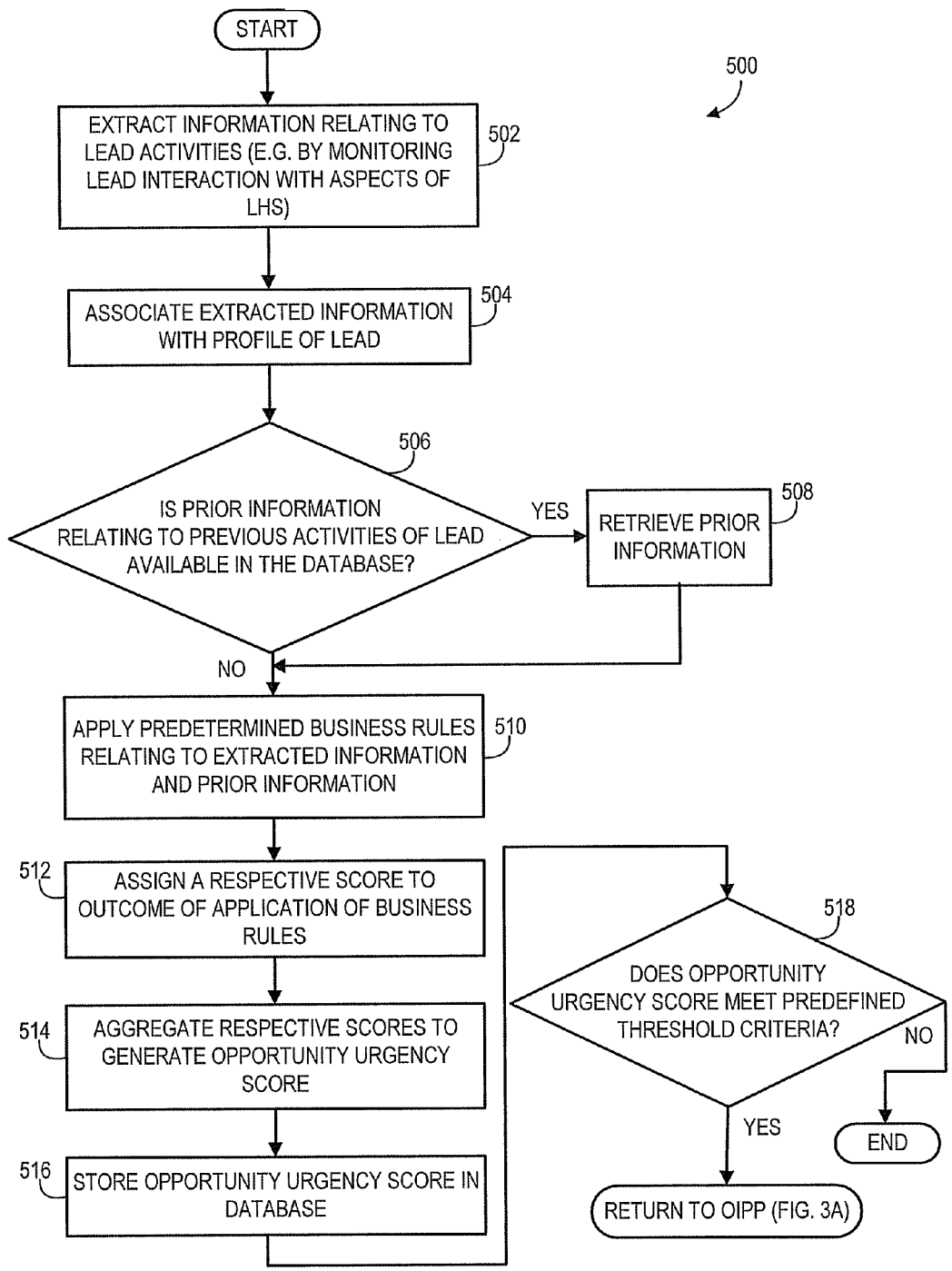
FIG. 5 *EXEMPLARY OPPORTUNITY URGENCY SCORE CALCULATION PROCESS (OUSCP)*

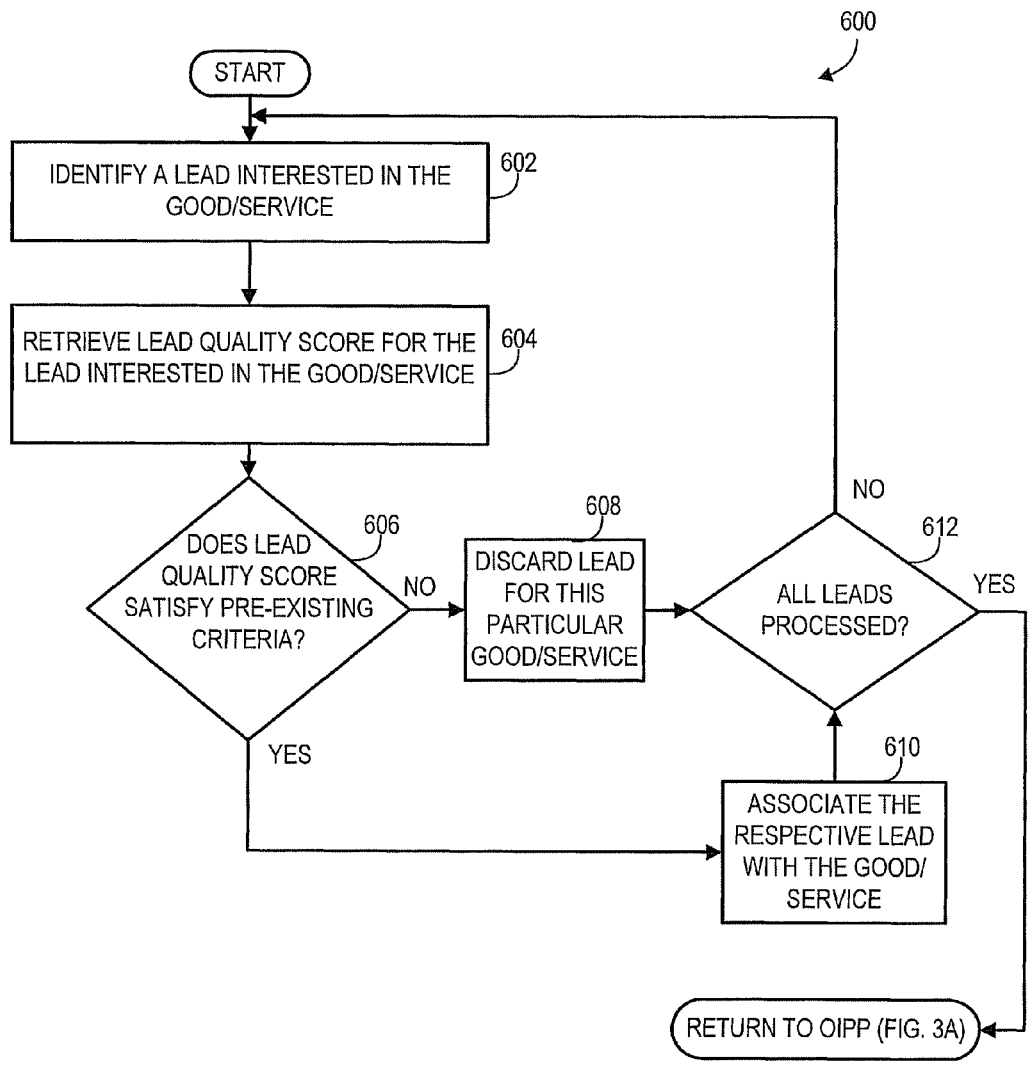
*FIG. 6  EXEMPLARY LEAD ASSOCIATION PROCESS*

LEAD ACTION TABLE

| LEAD ID | ACTION NAME | ACTION DATE | ACTION CONTEXT |
|---|---|---|---|
| 574 | VIEWED | 9/30/2012 | {G/S ID:24, "MOBILE", IP ADDRESS: 10.1.2.25} |
| 10 | FAVORITED | 10/2/2012 | {G/S ID:7, "DESKTOP", IP ADDRESS: 10.255.7.60} |
| | | | |
| | | | |
| | | | |

*FIG. 7 EXEMPLARY LEAD ACTION TABLE DATABASE SCHEMA*

| TIME STAMP | OPPORTUNITY ID | OPPORTUNITY TYPE ID | LEAD ID | G/S ID | MARKETER ID | QUALITY SCORE | URGENCY SCORE | OVERALL OPPORTUNITY SCORE |
|---|---|---|---|---|---|---|---|---|
| 9-30-2012 10:30 AM | 10 | 3 | 52 | 19 | 1 | 155 | 0.8 | 0.9 |
| 9-30-2012 11:00 AM | 8 | 5 | 7 | NULL | 22 | 10 | 0.6 | 0.05 |
| 10-1-2012 12:30 PM | 170 | 6 | NULL | 8 | 9 | 100 | 0.7 | 0.7 |
| 10-2-2012 1:00 AM | 662 | 12 | NULL | 70 | 12 | 200 | 0.1 | 0.25 |
| | | | | | | | | |
| | | | | | | | | |
| | | | | | | | | |

OPPORTUNITY TABLE

*FIG. 8* EXEMPLARY OPPORTUNITY TABLE DATABASE SCHEMA

OPPORTUNITY TYPE TABLE

| OPPORTUNITY TYPE ID | TEMPLATE TEXT |
|---|---|
| 3 | {PROPERTY NAME} WAS FAVORITED AT {TIME} |
| 2 | {PROPERTY NAME} WAS VIEWED AT {TIME} |
| 5 | {PROPERTY NAME} WAS USED IN LOAN CALCULATION AT {TIME} BY {LEAD ID} |
| 15 | {MARKETER SITE} WAS VIEWED BY {LEAD ID} THREE TIMES |
| 16 | {MARKETER SITE} WAS VIEWED BY {LEAD ID} FOUR TIMES |
| | |

*FIG. 9* EXEMPLARY OPPORTUNITY TYPE TABLE DATABASE SCHEMA

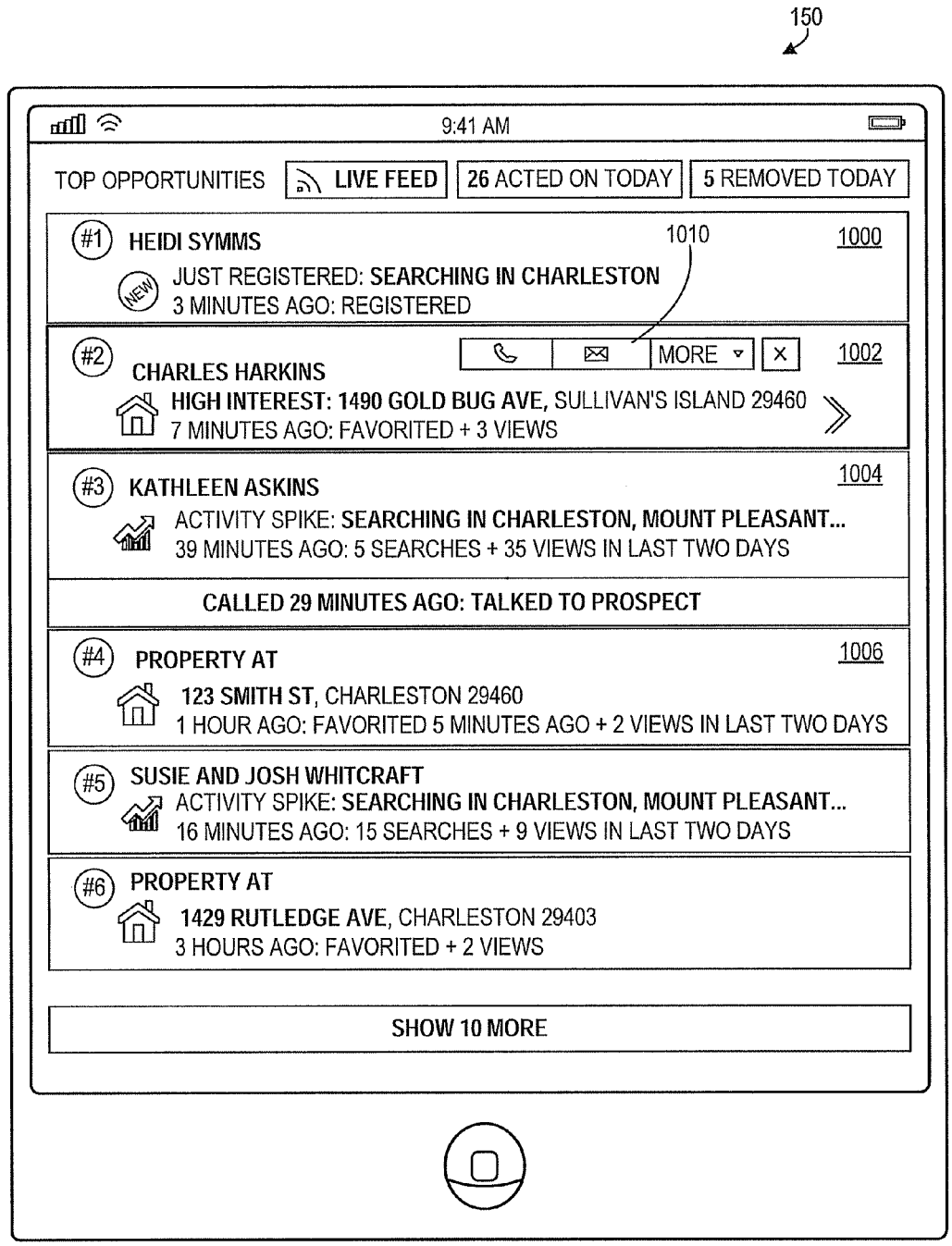
FIG. 10 EXEMPLARY LHS MARKETER INTERFACE

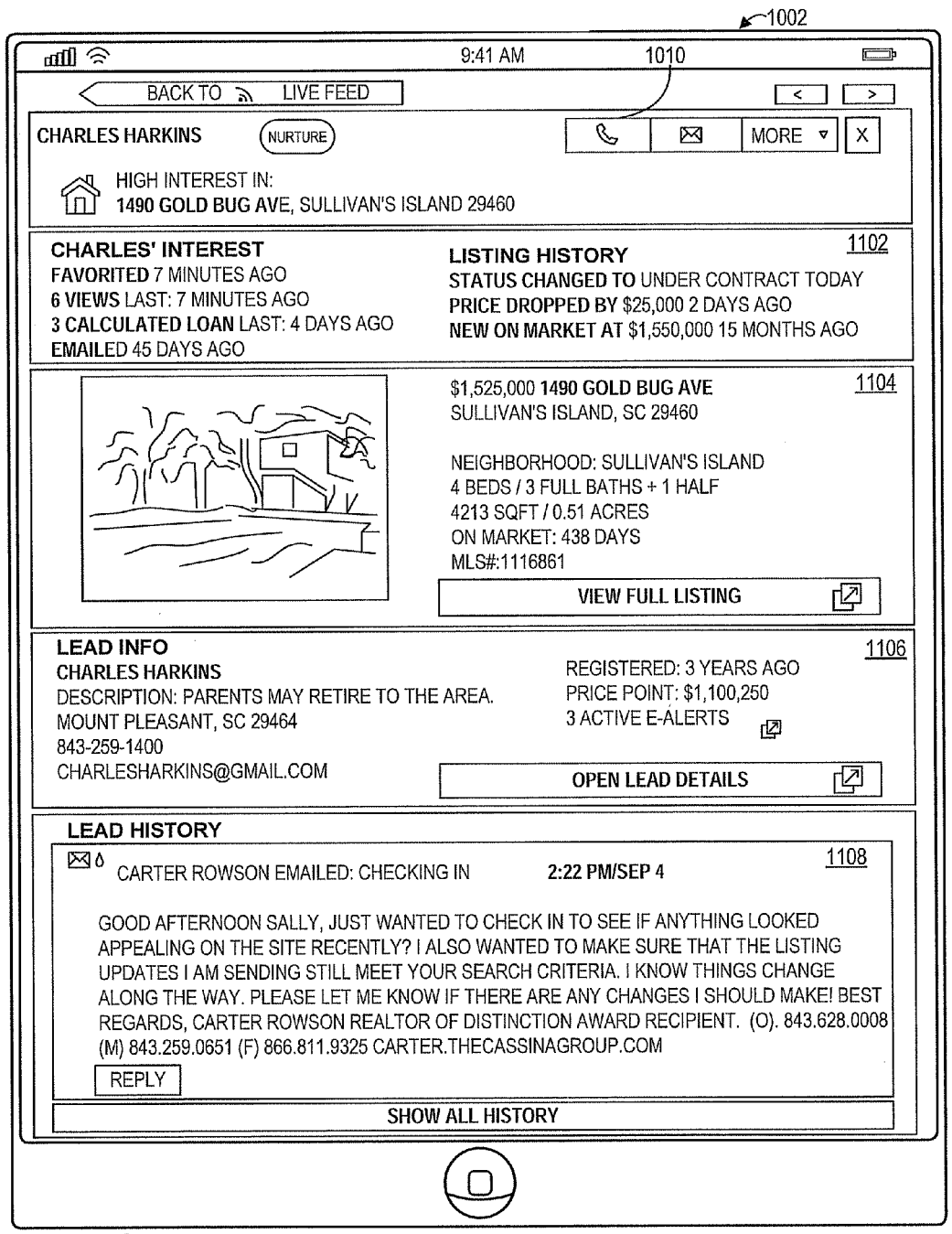
FIG. 11 EXEMPLARY LHS MARKETER INTERFACE SHOWING OPPORTUNITY DETAILS

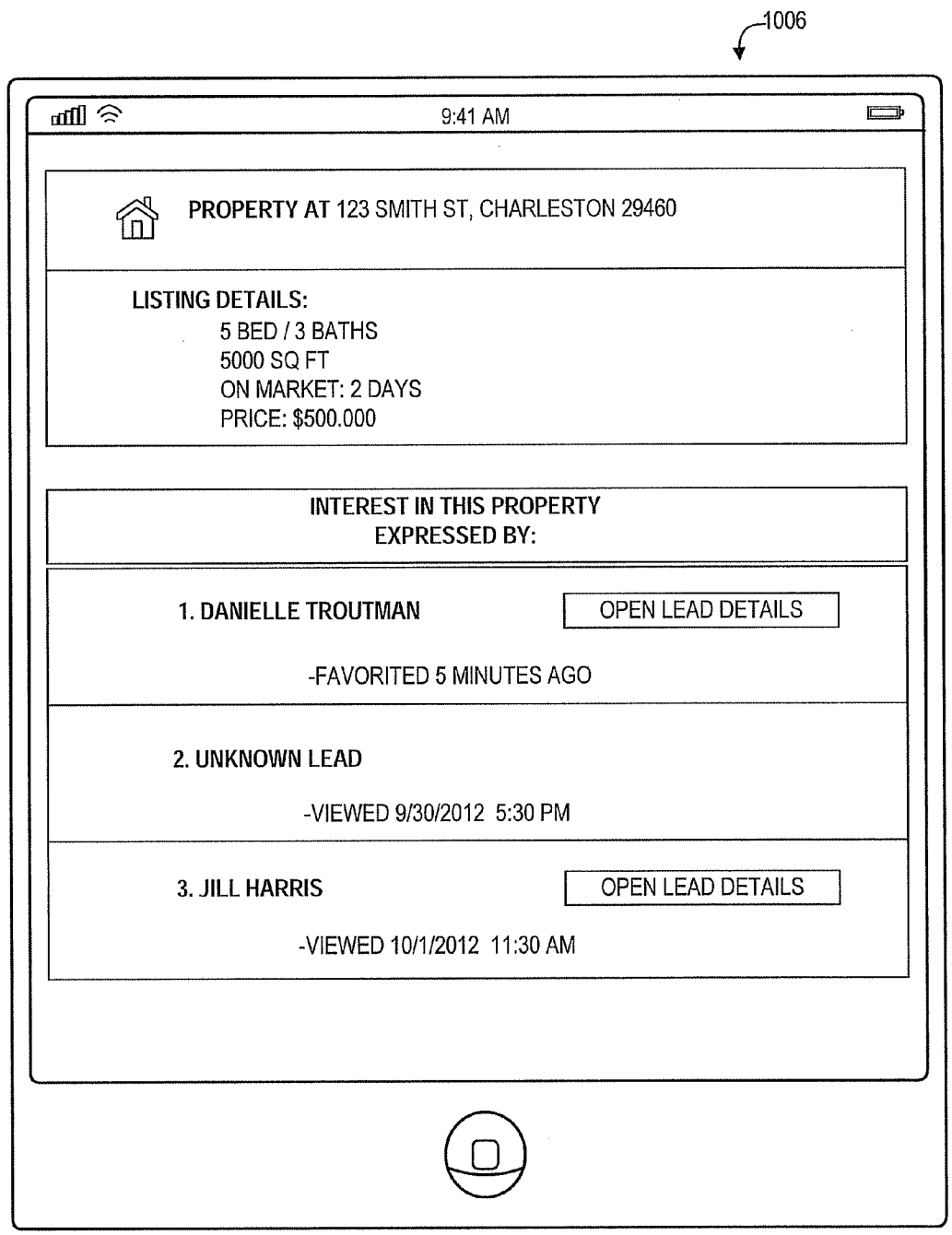
FIG. 12 EXEMPLARY LHS MARKETER INTERFACE SHOWING OPPORTUNITY DETAILS

SYSTEMS AND METHOD FOR PRIORITIZING REAL ESTATE OPPORTUNITIES IN A LEAD HANDLING SYSTEM BASED ON LEAD QUALITY AND OPPORTUNITY SCORES

CROSS REFERENCE TO RELATED APPLICATION

This application is a continuation application and claims the benefit of and priority under 35 U.S.C. §120 to U.S. patent application Ser. No. 13/734,135, filed Jan. 4, 2013, entitled "Systems and Methods for Managing and Prioritizing Opportunities for Marketers", by Donald James Sedota et al., which in turn claims the benefit of and priority under 35 U.S.C. §119(e) to U.S. Provisional Patent Application No. 61/715,676, filed Oct. 18, 2012, and entitled "Systems and Methods for Managing and Prioritizing Opportunities for Marketers," both of which are hereby incorporated by reference as if set forth herein in their entireties.

TECHNICAL FIELD

The present systems and methods relate generally to computer hardware and software systems associated with managing potential business opportunities relating to sales of goods and services, and more particularly to systems and methods associated with identifying and managing prioritized opportunities electronically for marketers (of goods and services) and/or their respective employees.

BACKGROUND

In the areas of sales and marketing, effective utilization of time generally is an important priority for marketers of goods and services to keep track of tasks/activities pertaining to clients and/or prospective clients (collectively referred to as "leads" herein). For instance, especially in the context of servicing a plurality of leads, marketers constantly have to juggle dealing with many different demands on their time. Marketers typically want to target leads that will result in the highest return on investment (ROI) for the marketer's time and efforts. However, managing a wide variety of leads at different stages of the buying process presents significant challenges for a marketer in allocating his or her time across the leads effectively.

Conventionally, different types of tools for effective time management of opportunities/tasks are available. Examples include various classes, books, websites, and application software (for desktop as well as mobile computers). Also, various off-the-shelf readymade means such as task planners, to-do lists, and the like are generally utilized by marketers of goods and services. However, these tools and means for time management are very generic and not tailored to a marketer's needs and objectives vis-à-vis specific industries of goods/services, specific market segments, specific marketing campaigns, etc. In addition to lacking custom or personalization features, such tools can be unnecessarily expensive and even cumbersome to use. Even worse, most tools for effective time management are unable to identify (automatically) potential business opportunities that are available for a marketer. Also, such tools fail to recognize which business opportunities are more important than others. In other words, a lead who is more interested in a marketer's goods/service will likely exhibit greater activity (e.g., with a marketer's website or marketing campaign) than a less interested lead.

For example, in a real estate marketing scenario, a potential home buyer X affiliated with a real estate broker might have been non-active (e.g., no replies to the real estate broker's emails or phone calls, no visits to the real estate broker's website) for the last few months but suddenly shows a spike in activity (e.g., by multiple visits to a real estate broker's website) in the last week. This spike in activity might indicate a buyer's renewed interest in buying a real estate property, and thus may represent an important business opportunity for the real estate broker's consideration. As a result, identification and prioritization of opportunities associated with this particular homebuyer (and other similar homebuyers) can benefit the real estate broker who can focus on activities or tasks that will result in the real estate broker being able to sell a home to the potential home buyer X. Furthermore, if there is another potential home buyer Y affiliated with the same real estate broker, but home buyer Y has shown a sustained but somewhat subdued interest in buying a home, the real estate broker might (for the immediate time) prioritize the business opportunity associated with home buyer X at a higher level than that associated with home buyer Y.

Therefore, there is a long-felt but unresolved need for a system or method that provides automated, time sensitive mechanisms of identifying and prioritizing a marketer's opportunities/tasks in connection with leads, or in connection with one or more goods/services in which leads have already shown interest, or are likely to show interest. Since opportunities/tasks are highly subjective and usually difficult to quantify, an ideal system should provide a computational method of generating prioritized opportunities/tasks based on measurable/monitorable components e.g., various types of lead engagements (such as interactions by leads with a marketer's website), various types of information provided by leads, etc.), or a lack thereof. A prioritized list comprising top opportunities/tasks would enable a marketer to attend to his or her respective opportunities/tasks in a timely fashion. For instance, marketers could choose to work from the top of the prioritized list and decide which opportunities/tasks to pursue. There is a further need for a system that can deliver prioritized lists to marketers via an online web interface, a mobile phone application, a SMS text message, a MMS text message, or any other means of delivery. Accordingly, based on the knowledge of prioritized opportunities, marketers can employ one or more strategies and tasks as appropriate. For example, the system should identify (on behalf of the marketer) the particular leads or goods/services that are important for the marketer to take immediate action, which ones can the marketer defer, which ones can the marketer ignore, and other such activities. An ideal system for generating and delivering prioritized lists of marketers' opportunities/tasks should be capable of being accessed and operated easily by marketers and salesmen having minimal technical skills.

BRIEF SUMMARY OF THE DISCLOSURE

Briefly described, and according to one embodiment, aspects of the present disclosure generally relate to systems and methods for facilitating identification and prioritization of opportunities for marketers of goods and services. In one embodiment, the opportunities relate to business opportunities that a marketer can pursue. For example, an opportunity might be the identification of a particular consumer ("lead") that is interested in a good or service marketed by the marketer, as determined based on the lead's actions indicating such interest. These actions may be identified based on the consumer's online activity, communications or responses to traditional communication mechanisms, social media interactions, past purchases of similar items, etc. Such identification and prioritization of opportunities generally enables the respective marketer to maximize his or her time by pursuing those opportunities that are most urgent and/or are most likely to result in sales of goods and services. According to one aspect of the disclosed system, upon identification of one or more opportunities for a marketer, the opportunities are scored and ranked based upon predetermined quality attributes, urgency attributes, and other information, and are presented to the marketer to take action (if desired).

As explained in detail herein, and according to one aspect of the present disclosure, an "opportunity" is a suggested or possible action that can be taken by a marketer or other entity based on satisfaction of one or more predetermined rules, wherein the opportunity relates to a potential business opportunity (e.g., an opportunity to sell a marketer's products or services to a lead or leads). The actions of consumer or leads generally correspond to satisfaction of predetermined rules, which suggest a corresponding activity (opportunity) that a marketer can take to potentially sell a good/service to the consumer or otherwise obtain the consumer's business. Examples of suggested or possible actions in connection with a marketer selling goods/services to leads include (but are not limited to) making a telephone call about a good/service that a lead may have expressed in, sending an email about a good/service that a lead may have expressed in, meeting a lead in person, sending a SMS/MMS text message about a good/service that a lead may have expressed in, associating the lead in a marketing campaign, removing a lead from a marketing campaign, associating specific goods/services with certain selected leads, etc. Thus, according to aspects of the present disclosure, opportunities can include one or more leads or can include one or more goods/services offered by marketers to leads.

According to one aspect, the disclosed system monitors various aspects of lead activity or non-activity. Examples of such aspects include visits to a marketer's website by leads, a marketer's phone calls to/from leads, a marketer's email communications to/from leads, a marketer's text messages to/from leads, one or marketing campaigns created by the marketer involving goods/services offered to leads, third party information services (credit bureaus, banks, financial institutions, white page services, multiple listing services, etc.) that provide information about a lead, and various other aspects.

In many scenarios, non-activities of leads are utilized by the present system to identify triggering events associated with leads and/or various goods/services. Examples of non-activity can include a lead not responding to a marketer's emails, text messages, phone calls; a lead not visiting the marketer's website, and other non-activities that might indicate an opportune time for a marketer to reach out to a lead or reconnect with a previous lead.

According to another aspect, the disclosed system generates opportunity scores by analyzing various kinds of lead- and non-lead-based information and data. Such scores are thereafter used to rank opportunities and then provided to marketers to enable marketers to take actions. In one exemplary embodiment, the opportunity scores are generated as a combination of an opportunity quality-related score component and an opportunity urgency-related score component. In another exemplary embodiment, the opportunity quality-related score component is generally associated with calculating a quality measure/score associated with a potential business opportunity. In yet another exemplary embodiment, the opportunity urgency-related score component is generally associated with calculating an urgency measure/score associated with a potential business opportunity, e.g., based on the occurrence of various dynamic event triggering data attributes.

These and various other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system environment in which an embodiment of the present lead/customer handling system ("LHS") is utilized for identification of opportunities in connection with leads and/or goods/services.

FIG. 2 illustrates an exemplary system architecture of the LHS, according to one embodiment of the present system.

FIG. 3 (consisting of FIG. 3A and FIG. 3B) is a flowchart showing high-level, computer-implemented method steps (implemented via the LHS) for an opportunity identification and prioritization process (OIPP) in connection with creating prioritized opportunities for marketers, according to one embodiment of the present system.

FIG. 4 is a flowchart showing an exemplary opportunity quality score calculation process (OQSCP) involved as a sub-process within an exemplary OIPP, according to one embodiment of the present system.

FIG. 5 is a flowchart showing an exemplary opportunity urgency score calculation process (OUSCP) involved as a sub-process within an exemplary OIPP, according to one embodiment of the present system.

FIG. 6 is a flowchart showing an exemplary lead association process involved as a sub-process within an exemplary OIPP, according to one embodiment of the present system.

FIG. 7 is an exemplary LHS database schema showing a lead action table, according to one embodiment of the present system.

FIG. 8 is an exemplary LHS database schema showing an opportunity table, according to one embodiment of the present system.

FIG. 9 is an exemplary LHS database schema showing an opportunity type table, according to one embodiment of the present system.

FIG. 10 is a screenshot of an exemplary LHS marketer interface showing a list of prioritized opportunities/tasks, according to one embodiment of the present system.

FIG. 11 is a screenshot of an exemplary LHS marketer interface showing additional details relating to a hypothetical prioritized lead-based opportunity, according to one embodiment of the present system.

FIG. 12 is a screenshot of an exemplary LHS marketer interface showing additional details relating to a hypothetical prioritized non-lead-based opportunity, according to one embodiment of the present system.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

Aspects of the present disclosure relate to systems and methods for facilitating identification and prioritization of opportunities for marketers of goods and services. In one embodiment, the opportunities relate to business opportunities that a marketer can pursue. For example, an opportunity might be the identification of a particular consumer ("lead") that is interested in a good or service marketed by the marketer, as determined based on the lead's actions indicating such interest. These actions may be identified based on the consumer's online activity, communications or responses to traditional communication mechanisms, social media interactions, past purchases of similar items, etc. Such identification and prioritization of opportunities generally enables the respective marketer to maximize his or her time by pursuing those opportunities that are most urgent and/or are most likely to result in sales of goods and services. According to one aspect of the disclosed system, upon identification of one or more opportunities for a marketer, the opportunities are scored and ranked based upon predetermined quality attributes, urgency attributes, and other information, and are presented to the marketer to take action (if desired).

In one embodiment, marketers maintain a business relationship with the entity or organization that hosts the presently disclosed system, wherein the disclosed system monitors various activity of lead activity or non-activity. Examples of such activity include visits to a marketer's website by leads, a marketer's phone calls to/from leads, a marketer's email communications to/from leads, a marketer's text messages to/from leads, one or marketing campaigns created by the marketer involving goods/services offered to leads, third party information services (credit bureaus, banks, financial institutions, white page services, multiple listing services, etc.) that provide information about a lead, and various other aspects. In several aspects, the disclosed system extracts information relating to leads either by manual means, automatic means, or some combination of manual and automatic means. Information relating to leads generally comprises "static information", e.g., provided by leads or other sources, or "dynamic information" identified by the system based on triggering events associated with leads and/or various goods/services. Such static and/or dynamic information is used by computer-implemented processes of the disclosed system to predict/identify potential business opportunities for a marketer.

As explained in detail herein, and according to one aspect of the present disclosure, an "opportunity" is a suggested or possible action that can be taken by a marketer based on satisfaction of one or more predetermines rules, wherein the opportunity generally relates to a potential business opportunity (e.g., an opportunity to sell a marketer's products or services to a lead or leads). Examples of suggested or possible actions in connection with a marketer selling goods/services to leads include (but are not limited to) making a telephone call about a good/service that a lead may have expressed in, sending an email about a good/service that a lead may have expressed in, meeting a lead in person, sending a SMS/MMS text message about a good/service that a lead may have expressed in, associating the lead in a marketing campaign, removing a lead from a marketing campaign, associating specific goods/services with certain selected leads, etc. Thus, according to aspects of the present disclosure, opportunities can relate to one or more leads or, can relate to one or more goods/services offered by marketers to leads.

In many scenarios, non-activities of leads are utilized by the present system as triggering events to identify potential opportunities. Examples of non-activities can include a lead not responding to a marketer's emails, text messages, phone calls, etc.; a lead not visiting the marketer's website, and other non-activities as identified by the disclosed system that might signify an opportunity for a marketer to reach out to a lead. For example, if no activity, then a consumer products firm, etc. might need to check if a lead is still interested in buying good/service.

As described herein, a marketer is a person or an entity that either directly provides goods/services to leads, or act as an intermediary that encourages leads to buy goods/services provided by some other entity or person. Thus, according to certain aspects as described herein, an example of a marketer can be a used car dealership, a real estate broker, a consumer products firm, etc. Also, in other aspects, a marketer can be an owner of a good/service.

Exemplary Embodiment

Generally, aspects of the present disclosure are applicable to virtually any marketing scenario or marketer opportunity management and prioritization context. For purposes of illustration and discussion however, the present disclosure will sometimes refer to a real estate marketing scenario. In such a scenario (as exemplarily illustrated in some of the drawings), the marketers are depicted as real estate brokers and agents, and the leads are depicted as potential homebuyers. As will be understood and appreciated, aspects of the presently disclosed system are particularly well-suited for the real estate industry. However, no limitation is intended by use of this illustrative example, and aspects of the present disclosure can be utilized in a variety of contexts and industries. Also, no restrictions are intended to be imposed on the number of leads or the number of marketers in a system, or even the number of employees affiliated with a marketer. Various other embodiments, associated features and functionalities will be better understood from the discussions that follow.

Referring now to the figures, FIG. 1 illustrates an overview 100 of an embodiment of a lead/customer handling system (LHS) 110 in an exemplary environment, constructed and operated in accordance with various aspects of the present disclosure. As shown, the LHS 110 includes a lead management service module 206 for carrying out various computer-implemented processes of the LHS. Further, the LHS 110 also includes one or more LHS databases 114 for storing marketer data, lead/customer data, and various other types of data associated with opportunities. (Architectural details showing various software modules and engines comprising an embodiment of the LHS 110 will be described in greater detail in connection with FIG. 2.)

According to the embodiment shown, the LHS 110 is in operative connection with one or more leads 102, one or more marketers 104, and one or more third party information services 158 (e.g., generally comprising one or more servers 160 and one or more databases 162). Examples of third party information services 158 include white page services, credit bureaus, multiple listing services, and the like. It will be understood that both leads and marketers may access the LHS 110 via electronic devices 122 such as computers (e.g., laptops, desktops, tablet computers, etc.) or mobile computing devices (e.g., smart phones) over networks 108 (such as the Internet). In many scenarios, employees affiliated with marketers such as a broker 104A and a real estate agent 104B are operatively connected to the LHS. Also, in some LHS embodiments, the LHS allows role-based access that allows individuals in a managerial position (e.g., supervisors, principals, directors, or other such people) affiliated with a marketer 104 to review marketing communications occurring between their employees and leads/customers. In one embodiment, the LHS 110 functions as a back-end system and leads generally are not aware that they are interacting with the LHS 110 via a marketer's website, or a mobile app, or other such access mechanisms that are operatively coupled to the LHS 110. Thus, the LHS 110 uses such access mechanisms to extract activities (and non-activities) of leads.

According to one exemplary hypothetical scenario as shown in FIG. 1, leads 102 are potential customers who wish to buy real estate property in a certain geographical area. Generally, one goal of a marketing entity (e.g., a real estate brokerage firm) that operates the LHS 110 is to reach as many leads as possible (but in an effective way), with the ultimate purpose of converting such leads into homebuyers. Thus, in this illustration example, the LHS 110 utilizes a plurality of types of information (e.g., provided via various operative connections as mentioned above) to identify potential opportunities for a marketer 104. Examples of activities by a lead or other entity that might indicate an opportunity for a marketer include (but are not limited to) lead engagement with a marketer's marketing campaign including emails, text messages, and phone calls from a marketer to a lead; lead engagement with a marketer's website; a lead visiting the marketer in person; a lead asking for details about a specific good/service, etc. Such lead activities can generally relate to potential business opportunities for a marketer, and are identified accordingly by aspects of the present system. Further, in many scenarios, non-activities of leads 102 can indicate potential opportunities for a marketer. For example, a lead not responding to a marketer's emails, text messages, phone calls; a lead not visiting the marketer's website, and other non-activities can generally be identified (by the disclosed system) as an opportunity to reach out to a lead in a different way.

According to aspects of the present disclosure, the present system facilitates identification and prioritization of opportunities for marketers of goods and services. As explained in detail herein, and according to one aspect of the present disclosure, an "opportunity" is a suggested or possible action that can be taken, based on satisfaction of one or more pre-determines rules, wherein the opportunity generally relates to a potential business opportunity (e.g., an opportunity to sell a marketer's products or services to a lead or leads). Examples of suggested or possible actions in connection with a marketer selling goods/services to leads include (but are not limited to) making a telephone call about a good/service that a lead may have expressed in, sending an email about a good/service that a lead may have expressed in, meeting a lead in person, sending a SMS/MMS text message about a good/service that a lead may have expressed in, associating the lead in a marketing campaign, removing a lead from a marketing campaign, associating specific goods/services with certain selected leads, etc. Thus, according to aspects of the present disclosure, opportunities can include one or more leads or, can include one or more goods/services. In one embodiment, the LHS generates overall opportunity scores (exemplarily shown in FIG. 8) by analyzing various kinds of information and data, as will be discussed in detail in connection with FIGS. 3, 4, 5, and 6. In another embodiment, such scores are used to rank opportunities which are then provided to marketers 104 to enable marketers to take actions.

For purposes of illustration and explanation, four exemplary opportunities (Opportunities 1-4) are illustratively shown in FIG. 1. As shown in opportunity 1 in FIG. 1, a lead 102A who is interested in buying a real estate property bookmarks a property as a favorite on a marketer's website when this bookmarking occurs, the present system identifies this indication as a "triggering event" and notifies (e.g., via notifications 106) the marketer 104 associated with the real estate property. When a lead 102 performs any other action in connection with a marketer's website as determined by the LHS 110, or performs some action as determined by other information services 158 (e.g., credit bureaus, banks, court records, market trend research agencies, etc.) the LHS 110 records such action and classifies the action into a predetermined triggering event. Such triggering events are utilized by the LHS 110 to compute an "opportunity urgency" score, e.g., as discussed above and will be further discussed in connection with FIG. 5. In other words, and more generally, activities or non-activities of leads, as well as information in a lead's profile are compared with some pre-defined criteria by the LHS 110. If the criteria are satisfied, then the associated leads (or goods/services) are identified as opportunities by the LHS 110. Information relating to opportunities are usually transmitted to marketers' electronic devices 122 in the form of notifications 106 and posted on marketers' opportunity walls 150. Also, in one embodiment, activities or non-activities of leads are identified as triggering events (also termed as dynamic information previously herein) by the LHS 110. It will be understood that in many scenarios one or more marketers can have one or more identical opportunities listed on their respective opportunity walls.

In another example (Opportunity 2 in FIG. 1), when a lead 102B shares information relating to a real estate property with his or her friends online, the LHS 110 records such action and classifies the action as a predetermined triggering event. As will be explained later herein, such triggering events can be used to evaluate, score and/or numerically rank the importance of opportunities for a marketer 104.

In another example (Opportunity 3), when a lead 102C who is interested in buying a real estate property physically visits a property, the present system notifies (e.g., via notification 106) the marketer 104 associated with the real estate property. Such notification can occur as an outcome of the LHS 110 monitoring whether a lead 102C is at a target geo-location or in the vicinity of a target geo-location. Accordingly, and as illustrated via Opportunity 3 in FIG. 1, the LHS 110 determines that the lead's presence at a property satisfies come preexisting rule indicating a business opportunity for the marketer and thus notifies the marketer 104 so as to enable the marketer 104 to meet the lead 102C in person at such geo-locations or in their vicinity. According to one aspect of the present disclosure, information corresponding to a lead's current location is transmitted (to marketers 104 or the LHS 110) by a mobile device application program running on the lead's mobile device 122, wherein the instantaneous location is obtained with the help of a location sensor embedded in the mobile device that communicates with the mobile device application program running on the lead's mobile device 122. Alternately, a mobile device application program running on the lead's mobile device might communicate with a third-party location-based service provider (such as LOCAID™, of San Francisco, Calif., for example) which then provides the lead's current location directly to marketers 104 via the LHS 110.

It will be understood that triggering events or actions that might signify opportunities are not necessarily limited to leads 102. In other words, triggering events can also be associated with marketers 104 and/or their offered goods/services. In one exemplary scenario, if the price of a high-ticket, popular item of good/service is reduced (e.g., by a real estate property owner 164 as indicated in Opportunity 4 shown in FIG. 1), then it is likely that leads 102 who have been previously interested in such an item might show an increased interest in the item, and thus a marketer's actions relating to sale of the item are generally considered as a high priority opportunity for a marketer 104 or a real estate property owner 164. Consequently, the marketer might benefit by calling or emailing those leads who have been previously interested in the item (or any leads that might be interest in the home, regardless of their post interest). In another example of an opportunity, a triggering event could include a marketer 104 updating the inventory information of goods/services, or when a marketer 104 takes an item of good/service off the market. From the examples of Opportunities 1-4 given above, it will be understood that identification and prioritization of opportunities can benefit marketers who can focus on activities that will result in the highest ROI for the respective marketer(s).

Although, in the examples above, the opportunities relate to single triggering events, it will be understood that opportunities are not limited to such types of events. In other words, opportunities can be identified after a predetermined number of triggering events occur, e.g., at least five visits to a marketer's website in the last ten days or, a lead engaging in at least two telephonic conferences with a marketer over a predetermined period of time, etc. In this way, opportunities can be seen as possible actions that can be taken by marketers based on the occurrence of one or more triggering events (e.g., by lead, by the marketer himself, etc.) that satisfy some predetermined rules.

In one embodiment, an opportunity comprises a weighted combination of two components: a quality-related component and an urgency-related component. In one exemplary embodiment, the quality-related and urgency-related components are utilized in accordance with pre-determined business rules to assign numerical scores for such components. According to aspects as disclosed herein, quality-related and urgency-related components are applicable to either a specific good/service offered by a marketer 104, or can relate to leads 102 (a/k/a clients and prospective clients of a marketer), or to some other asset or business possibility of a marketer 104.

In other aspects of the disclosed system, in addition to identification of opportunities, the present system prioritizes different opportunities for a marketer 104 based on an "opportunity identification and prioritization process (OIPP)" (e.g., as discussed in connection with FIGS. 3, 4, 5, and 6). Consequently, this enables marketers 104 to determine which lead(s) 102 and/or opportunities to pursue, and when. For example, a lead 102 that has been non-active for the last few months but shows a spike in activity (e.g., by multiple visits to a marketer's website) might indicate the lead's renewed interest in a particular product or service, and this may be a potential business opportunity for a marketer's consideration.

In one embodiment, and as shown in FIG. 1, the LHS 110 includes operative connections to leads/customers 102, marketers 104, and third party information services 158 via networks 108, such as the Internet. According to one aspect, the operative connections involve a secure connection or communications protocol, such as the Secure Sockets Layer protocol. Furthermore, it will be understood by one skilled in the art that communications over networks 108 typically involve one or more of a Web-deployed service with client/service architecture, a corporate Local Area Network (LAN) or Wide Area Network (WAN), or a cloud-based system. Moreover, as will be understood and appreciated, various networking components like routers, switches, hubs etc., are typically involved in the communications. Although not shown in FIG. 1, it can also be further understood that such communications may include one or more secure networks, gateways, or firewalls that provide information security from unwarranted intrusions and cyber attacks.

Generally, leads 102 interested in acquiring goods and services (e.g., real estate properties) will often search for real estate properties on search engine websites (e.g., YAHOO™ Search, GOOGLE™ Search, YELLOW PAGES™ Search, BING™ Search, etc.), or even real estate-specific search engine websites (e.g., ZILLOW™ Search, TRULIA™ Search, etc.). It will be understood that search engine websites often provide a listing of one or more marketers (e.g., real estate brokerage firms) to the leads 102. In order to route such leads to a given marketer's website, in one aspect, the LHS 110 (or individuals operating the LHS 110) pre-modifies the content on the given marketer's website such that the marketer's website is displayed at a higher position in the aforementioned listing of the one or more marketers 104. In some scenarios, the LHS 110 also manages pay-per-click ads on search engine websites so as to load the marketer's website when the pay-per-click ads are clicked by leads 104. There are various other ways that the LHS 110 can direct traffic to marketer websites, as will occur to a person skilled in the art.

It will occur to one skilled in the art that pre-modification of a marketer's website may include (but is not limited to) operative coupling between the LHS 110 and the marketer's website (more generally, any electronic web portal that facilitates mobile as well as non-mobile access), search engine optimization (SEO), implementation of advanced web-based technologies in the website, and various other techniques that place the marketer's website at a higher position in a listing of marketers. In one exemplary aspect, the LHS 110 automatically creates a templatized website for marketers that has the ability to attract a high volume of web traffic. The browser used to load the marketer's website can be running on devices 122. Examples of commonly used web browsers include but are not limited to software programs such as MICROSOFT™ INTERNET EXPLORER™, MOZILLA™ FIREFOX™, APPLE™ SAFARI™, GOOGLE™ CHROME™, and others. According to an aspect, an embodiment of the LHS is hosted on a physical server, or alternately in a virtual "cloud" server. In one embodiment, the LHS 110 functions as a back-end system and leads generally are not aware that they are interacting with the LHS 110 via a marketer's website, or a mobile app, or other such access mechanisms that are operatively coupled to the LHS 110. Thus, the LHS 110 uses such access mechanisms to extract activities (and non-activities) of leads.

In alternate aspects, the marketer's website can be configured as a mobile device application (app) such as that available for the popular APPLE™ IOS™ and GOOGLE™ ANDROID™ mobile device operating systems. According to other alternate aspects, the marketer's website configured as a mobile device application can co-exist jointly with the marketer's website accessible through a traditional web browser.

Additionally, still referring to FIG. 1, leads 102 can have knowledge of a marketer's goods and services, e.g., referral through friends or family, general product knowledge, or other sources. In such cases, leads might arrive at a marketer's website directly, i.e., without being diverted from search engine websites. Upon arrival at a marketer's website, a lead/customer can search for goods/services based on different criteria, such as specific types of goods and services, different keywords, street address, zip code, price, area of geographical interest-based search, etc. Geographical interest-based searches are usually integrated with map-based applications such as GOOGLE MAPS™, wherein the geographical interest-based searching includes navigation tools (panning, zooming, and rotating the map), and the like. It will be understood that in one aspect of the present disclosure, the LHS 110 (or, personnel operating the LHS 110) pre-modifies a marketer's website in order to include various search functionalities, as will occur to one skilled in the art.

In one embodiment, during a registration process, leads 102 provide information or preferences on the marketer's website, such as a desired frequency of receiving marketing communications from the marketer, types of marketing communications (e.g., email, phone call, text message, print mail, etc.) that are of interest to the respective lead, types of goods/services that the lead is interested in, specifics of such goods/services, budgets, and various other types of information. In several scenarios (such as in real estate marketing), leads might also provide a geographical area of interest, e.g., a street address/zip code, specific lifestyle (luxury, waterfront, historic, etc.), preferences, or other relevant information as applicable to a marketing campaign (if any) created by a marketer. Information provided by the leads 102 is usually processed by the LHS 110 so that the LHS 110 can better serve the preferences and requirements of leads 102, and consequently provide them with relevant information, e.g., in the form of marketing communications. In some alternate aspects, marketers may call or even meet with leads in person in order to provide a more personalized experience to leads.

Interaction between the leads and various aspects of a marketer's website can involve leads clicking on various links on the marketer's website, typing information inside predetermined text box fields, reviewing information displayed on the marketer's website, or more generally performing any kind of activity in association with the marketer's website. In one aspect, the LHS 110 tracks a lead's online activity with a marketer's website from the moment a lead first interacts with a marketer's website. Thus, in one aspect, keyword searches, button clicks, and other aspects of lead-interaction associated with browsing a marketer's website are collected and stored in an exemplary LHS database 114.

In one exemplary aspect, once a lead 102 is registered in the present system, many different lead quality attributes (e.g., extracted from interaction between leads and a marketer's website) are used to assess the quality of the lead. (Such lead quality attributes are utilized by the LHS 110 to compute an "opportunity quality" score, e.g., as discussed in connection with FIG. 4.) Generally speaking, a lead quality component is a measure of how serious a lead 102 is about purchasing one or more items of goods/services from one or more respective marketers 104. In one specific example, lead quality relates to determining the best or most viable leads 102 the marketer 104 should address. In determining the best or most viable leads, the LHS 110 generally prioritizes those leads 102 that are deemed to be of high quality.

In one embodiment, the LHS generates overall opportunity scores (exemplarily shown in FIG. 8) by analyzing either or both of opportunity quality-related and opportunity urgency-related score components. A prioritized list 150 (exemplified illustratively as an opportunity wall) comprising top opportunities (determined on the basis of their respective overall opportunity scores) enables a marketer 104 to attend to his or her respective opportunities/tasks in a timely fashion. In another embodiment, the LHS 110 delivers prioritized lists to marketers 104 via one or more notification mechanisms 106 such as an online web portal managed by the LHS, a mobile phone application program running on a marketer's mobile device 122, a SMS text message sent to a marketer's mobile device 122, a MMS text message sent to a marketer's mobile device 122, or any other means of delivery. Accordingly, based on the knowledge of prioritized opportunities, marketers can employ one or more strategies and tasks as appropriate. For example, the system will identify (on behalf of the marketer 104) which opportunities are important for the marketer 104 to take immediate action, which ones the marketer 104 can defer, which ones the marketer 104 can ignore, and other such activities. In LHS embodiments, a list of prioritized opportunities/tasks could be based on all (or a subset) of the marketer's opportunities or based on those opportunities that are specific to a particular good or service. (For example, in a real estate marketing scenario, a marketer such as a real estate agent or broker can see the top opportunities/tasks associated with a specific real estate property.) Exemplary screenshots showing a marketer's opportunities (along with additional details) in an illustrative "opportunity wall" are shown in connection with FIG. 10, FIG. 11, and FIG. 12.

The discussions above in association with FIG. 1 merely provide an overview of an embodiment of the present system for facilitating identification and prioritization of opportunities for marketers of goods and services. Accordingly, it will be understood that the descriptions in this disclosure are not intended to limit in any way the scope of the present disclosure. For example, in one embodiment, leads/customers are not required to register with a marketer via the marketer's website. Rather, leads might browse a web portal (operated by the LHS) containing information about different marketers and their associated goods/services. Also, it will be understood that opportunities are not limited to those caused by triggering events, as shown in FIG. 1. That is, opportunities can be identified from quality-related aspects of a lead or a good/service. Examples of attributes that may indicate lead quality include a valid phone number, a valid email address, overall site activity, communication history via phone and email, and other attributes discussed below. Examples of quality-related aspects of a good/service include a reasonably-priced real estate property available for sale in a decent neighborhood close to a good school, and the like. Various architectural details of an embodiment of the disclosed LHS 110 will be described next in greater detail.

FIG. 2 illustrates an exemplary system architecture 200 of one embodiment of the LHS 110. In one embodiment, the LHS 110 is hosted on a physical server, or a cloud server. Generally, marketers 104 and/or owners 164 of goods/services access the LHS 110 using web-enabled computing devices 122 such as computers, smart phones, tablet computers, etc. via networks 108. As shown, in one embodiment, the LHS 110 includes one or more LHS databases 114, a LHS management module (206) comprising various software modules, processes, sub-routines or generally, algorithms operated by the LHS 110. In one embodiment, the LHS management module includes a lead acquisition service module, a communication service module, a lead management service module, a communication scheduler module, and a communication score calculation module. In another embodiment, the lead management service module further includes sub-routines and algorithms (e.g., processes such as the OIPP disclosed in FIGS. 3A and 3B and other sub-routines) operated by the LHS 110.

In one specific embodiment and as shown in FIG. 2, the lead management service module 206 includes an event handling service module 252, a periodic calculation service module 254, and a decay service module 256. Generally, the functions of the event handling service module 252 relate to receiving information relating to triggering events (e.g., a lead bookmarking one or more goods/services on a marketer's website as favorites of the lead, a marketer taking some action relating to a good/service such as sending a marketing communication to a lead, and the like). In one embodiment, the periodic calculation service 254 is involved in extraction of lead quality (or good/service quality) attributes (e.g., arising from interaction between leads and a marketer's website) that are used to assess the quality of the lead in computing opportunities for a marketer. Also, in many scenarios, the LHS 110 considers that the "value" of an opportunity can decay with time. For instance, when a new lead registers on a marketer's website, an opportunity window for reaching out and contacting the lead may be very short. Accordingly, a decay service module 256 computes the decay in the value of an opportunity with time. It will occur to one of ordinary skill that, in one scenario, decay of an opportunity may not start until the lead has been inactive on a marketer's site for a particular period of time. For example, if a lead 102 has been checking a marketer's website every couple of hours, then in one embodiment that lead is still considered an urgent lead. In one embodiment of the LHS 110, the decay service module 256 computes the decay of an opportunity using predetermined business rules as discussed exemplarily in connection with FIGS. 3, 4, and 5. Further, exemplary DB schemes are shown in FIGS. 7-9.

In one embodiment, the exemplary LHS database 114 stores data collected from leads/customers 102, marketers 104, configuration settings relating to leads, lead quality attributes, dynamic event triggering data attributes, marketing communication details, marketing communication scores, opportunity quality scores, opportunity urgency scores, marketer information, communication history details, and the like. This database 114 also stores various predetermined rules relating to handling event triggering data attributes. Details of such handling will be discussed in connection with FIGS. 3, 4, and 5.

As will be understood by one skilled in the art, various other modules and components (different from the ones described in FIG. 2) may comprise the LHS 110 in alternate embodiments. The modules and software engines discussed in connection with FIG. 2 are for exemplary purposes only, i.e., alternate embodiments are not limited to the specific modules and software engines discussed herein. For example, in an alternate embodiment, functionalities of one or more of the aforementioned modules 252, 254, and 256 can be combined into a single or even multiple module(s), possibly with other functionalities as will occur to one of ordinary skill in the art. Also, one or more of these aforementioned modules can be combined with one or more exemplary modules (e.g., lead acquisition service module, communication service module, etc.). Even further, various other types of information can be stored in the LHS database 114, and are not limited to that which is described herein. In what follows next, a high-level overview of an exemplary LHS process will be described.

Turning to FIG. 3 (consisting of FIG. 3A and FIG. 3B), an exemplary LHS-implemented opportunity identification and prioritization process (OIPP) 300 is shown. As shown in FIG. 3, in one embodiment, an exemplary OIPP may include two parallel processes, a first process corresponding to an "opportunity quality score calculation process (OQSCP) 400", and a second process corresponding to a "opportunity urgency score calculation process (OUSCP) 500". Specific method steps involved in embodiments of the OQSCP and OUSCP are discussed in connection with FIGS. 4 and 5, respectively. A lead association process (shown exemplarily as sub-process 600 in the main OIPP) is discussed in connection with FIG. 6. As will be understood and appreciated, the steps (sub-routines and the steps included therein) of the process 300 shown in FIG. 3 may operate concurrently and continuously, are generally asynchronous and independent, computer-implemented, tied to particular machines, and not necessarily performed in the order shown. In the discussions that follow, it will be understood that the various steps of the OIPP 300 are described as being performed by the LHS 110.

As discussed previously, activities or non-activities of leads, as well as information in a lead's profile are compared with some pre-defined criteria by the LHS 110. If the criteria are satisfied, then the associated leads (or goods/services) are identified as opportunities by the LHS 110. Information relating to opportunities are usually transmitted to marketers' electronic devices in the form of notifications and posted on marketers' opportunity walls 150 (as shown in FIG. 1 exemplarily). In one embodiment, the LHS 110 scores opportunities via one or more scoring processes (as discussed below in greater detail in connection with the OQSCP and OUSCP). Respective scores of various opportunities are used to further rank opportunities before being displayed on marketers' opportunity walls.

In an exemplary embodiment, the OQSCP (discussed in detail in FIG. 4) is generally associated with calculating a quality measure/score associated with a potential business opportunity. Whereas, in another exemplary embodiment, the OUSCP (discussed in detail in FIG. 5) is generally associated with calculating an urgency measure/score associated with a potential business opportunity. Returning back to OIPP (from either or both of OQSCP and OUSCP) at step 302, the LHS 110 determines whether or not to combine the opportunity quality score with the opportunity urgency score. In some embodiments, only concerned with urgency, others only qualify. But, preferably a combination of opportunity quality scores and opportunity urgency scores are used in LHS embodiments. If the LHS determines not to combine the quality and urgency scores, then the system sets the overall opportunity score to either the opportunity quality score (at step 316), or the opportunity urgency score (at step 314), based on a decision step 312. After setting the overall opportunity score to one or the other, the OQSCP moves to step 306.

If the quality and urgency scores are not to be combined, then at step 304, the LHS calculates the overall opportunity score by combining the quality and urgency scores according to a predefined algorithm. The combination algorithm might involve some weighted combination of the two scores, or a simple 50/50 combination, or some other combination as will occur to one of ordinary skill in the art. At next step 304, the LHS determines whether or not the opportunity corresponds to a good/service (e.g., see FIGS. 10 and 12). If the LHS 110 determines that the opportunity relates to a good/service, then the LHS enters a lead association process at next step 600 (discussed in detail in FIG. 6) for identifying those leads who might be interested in the given good/service. After returning to the OIPP from the lead association process 600, the LHS stores the overall opportunity score in one or more LHS databases 114 (step 318), and the OIPP continues thereafter to step 320.

However, if at step 306 the LHS determines that the opportunity does not relate to a good/service, then at next step 308 the LHS further determines whether the opportunity corresponds to another business possibility. For example, such a business opportunity might be a networking event hosted by a marketer. If the opportunity does not correspond to a business possibility, the LHS assumes the opportunity must be lead-related, stores (at step 318) the overall opportunity score in a LHS database 114, and continues to step 320.

Still referring to FIG. 3A, if at step 308, the LHS determines that the opportunity corresponds to a business opportunity (possibility), the LHS 110 processes the opportunity according to a predefined algorithm at step 310, and then the OIPP exits thereafter. In one exemplary scenario, such a business opportunity can be related to matching potential home buyers and real estate properties for an open house event organized by a marketer. In this exemplary scenario, a marketer might wish to determine home buyers in the age range thirty to forty five years old who might be interested in ocean front properties and also having an indoor jacuzzi in Del Mar Beach, San Diego. Thus, a predefined algorithm can mine through the profiles of leads who satisfy the above criteria, and also mine through potential real estate properties that satisfy the above criteria. Accordingly, the predefined algorithm can perform an automatic pairing based on a lead's profile information (and prior event triggering attributes) and based on the information pertaining to the real estate property.

Now turning to FIG. 3B, at step 320, the OIPP ranks opportunities based on their overall opportunity score (determined previously at any of steps 304, 314, 316 or 318). Subsequently, the LHS determines at step 322, whether, prior opportunities exist in LHS databases 114. If prior opportunities exist, then those prior opportunities are retrieved at step 324. Next, at step 326, the OIPP generates a prioritized list of one or more opportunities using ranked opportunities (from step 320) and prior opportunities, if any (from step 324). This prioritized list is provided to a marketer 104 (at step 328). (An exemplary interface showing a snapshot (in time) of a prioritized list of opportunities is displayed in connection with FIG. 10.) If the LHS determines that additional opportunities exist, then the LHS 110 restarts the OIPP. But if no additional opportunities exist, the OIPP terminates.

Now referring to FIG. 4, an exemplary opportunity quality score calculation process 400 (OQSCP) is shown. In one embodiment, the OQSCP is used in conjunction with calculating an overall opportunity score associated with a potential business opportunity, e.g., as illustrated in FIG. 3A and FIG. 3B.

Starting at step 402 in FIG. 4, the OQSCP retrieves (from a database) or receives various opportunity quality attributes. Examples of such attributes include quality of lead information such as valid email and phone number, degree of a lead's focus on good/services, degree of a lead's activity on a marketer's website, etc. (Further examples of such attributes along with an opportunity score calculation example is provided later herein. Various details of the OQSCP will be better understood with the help of the opportunity score calculation example.) At step 404, the OQSCP applies predetermined business rules relating to the retrieved opportunity quality attributes. Next, at step 406, the OQSCP applies a respective score to the outcome(s) of application of business rules. For example, if a lead has a valid phone number, assign 20 points to the lead quality score. Because the OQSCP can utilize one or more business rules to score opportunities, the OQSCP aggregates respective scores (from applying respective business rules at step 408) to generate an opportunity quality score. Then, the OQSCP stores (at step 410) the opportunity quality score in one or more LHS databases. At subsequent step 412, the LHS determines whether or not the opportunity quality score (generated at step 408) meets one or more predefined threshold criteria. An example of a predefined threshold criteria could be that the opportunity quality score has to be in the $40^{th}$ percentile (signifying a "quality" lead). If the opportunity quality score meets the one or more predefined threshold criteria, then the OQSCP returns to the main OIPP (e.g., step 302 in FIG. 3A). If the opportunity quality score does not meet the one or more predefined threshold criteria, then the OQSCP terminates.

Turning now to FIG. 5, an exemplary opportunity urgency score calculation process 500 (OUSCP 500) is shown. It will be recalled from the previous discussions that the OUSCP, either alone or in combination with the OQSCP (e.g., as discussed in FIG. 4), is used to calculate an overall opportunity score for a potential business opportunity. For purposes of better understanding, an example showing calculation of overall opportunity score will be provided later herein.

Starting at step 502 in FIG. 5, the OUSCP extracts information relating to lead activities. As mentioned previously, the OUSCP is generally associated with triggering events. Examples of triggering events include monitoring interactions of leads with the LHS (e.g., via a marketers website), or non-activity of the leads with respect to the LHS, or some other triggering event. For example, the LHS 110 might monitor various goods/services for which a lead has expressed interest, whether or not a lead has bookmarked goods/services on the marketer's website as the lead's favorites, and various other actions performed by leads 102. When a lead performs any action (exemplarily showed in FIGS. 7 and 9) in connection with a marketer's website as determined by the LHS 110, or performs some action as determined by other third party information services 158 (e.g., credit bureaus, banks, court records, market trend research agencies, etc.), the LHS 110 records such action and classifies the action into a predetermined "triggering event". Then, at step 504, the OUSCP 500 associates the extracted information with the profile of a specific lead 102. In many scenarios, prior information in connection with previous activities or non-activities of leads are available as pre-stored information in a database. Thus, at step 506, the OUSCP determines whether prior information is available or not. In one exemplary scenario, a lead may have visited a marketer's website twice in the last seven days. Such visits by a lead affects the value of the opportunity score of the lead, according to LHS aspects. This is because in LHS embodiments, a lead's cumulative activities (or non-activities) (for instance, over a predetermined time-interval) affects the lead's opportunity urgency score in component in the overall opportunity score component. On the other hand, if no prior information is available then the opportunity urgency score depends on current activities or non-activities of the lead. Accordingly, the OUSCP retrieves (at step 508) prior information in connection with previous activities or non-activities of leads, or alternately proceeds to next step 510. At step 510, the OUSCP applies predetermined business rules to the extracted information (at step 502) and the retrieved prior information, if any (at step 508). Then, the OUSCP assigns (at step 512) a respective score to the outcome(s) of application of business rules. At subsequent step 514, the OUSCP aggregates the respective assigned scores to generate an opportunity urgency score. The OUSCP, in one embodiment, typically stores the opportunity urgency score in a database (step 516).

The OUSCP determines (at step 518) whether or not the opportunity urgency score (generated at step 514) meets one or more predefined threshold criteria. If the opportunity urgency score meets the one or more predefined threshold criteria, then the OUSCP returns to the main OIPP (e.g., step 302 in FIG. 3A). If the opportunity urgency score does not meet the one or more predefined threshold criteria, then the OUSCP terminates. Examples of criteria can involve the opportunity urgency score exceeding a predetermined threshold, such as 50%. Alternate examples of criteria can be a lead's visits to a marketer's website, or searches on a marketer's mobile app has to exceed a predetermined number. Various other criteria can be involved as will occur to one skilled in the art.

It will be understood that the steps shown in FIG. 5 (and other flowcharts herein) are for illustrative purposes only. Various alternate embodiments of the steps can be designed as will occur to one skilled in the art. For example, instead of assigning a respective score to a respective outcome of application of application of a business rule, multiple outcome(s) can be combined together.

According to one embodiment of the present disclosure, multiple business rules (e.g., as mentioned in connection with FIG. 4 and FIG. 5) can be granularly defined and ordered according to a predetermined sequence so that one business rule has higher priority over other business rules. In such a case, a business rule that has a higher priority will be first executed by the LHS 110, before a business rule having a lower priority is executed. As will be understood and appreciated, the priority or hierarchy of business rules may be dictated by system administrators operating the LHS 110, marketers 104, owners of goods/services, or preconfigured within the LHS 110, etc. As will be further understood by a person skilled in the art, this mechanism of application of business rules could automatically render (in many scenarios) a business rule that has a lower priority as being inoperative.

Turning to FIG. 6, an exemplary lead association process 600 is described for creating a logical linkage (e.g., in an electronic database) between particular leads and particular goods/services in connection with opportunities, according to one embodiment of the presently disclosed LHS. In several exemplary scenarios, multiple leads can be interested in buying a particular good/service from a marketer. In such scenarios, the LHS 110 identifies potential leads (based on information in a lead's profile, associated triggering events, or other factors) who are interested in a particular good/service, according to aspects as explained below.

Starting at step 602, the LHS identifies a lead interested in the good/service. Then at step 604, the LHS retrieves an opportunity quality score (or more specifically, a lead quality score) for the lead interested in the good/service. Next, the LHS determines (at step 606) whether or not the lead quality score (retrieved in step 604) satisfies pre-existing criteria. If the pre-existing criteria are not satisfied, then the LHS discards the lead for this particular good/service at step 608, and moves to step 612. However, if the pre-existing criteria are satisfied, then at step 610 the LHS associates the respective lead with this particular good/service (and thus, this opportunity), and next moves to step 612. At step 612, the LHS determines whether or not all leads in the database have been processed/checked for association. If all leads have been processed, then the LHS return to the main OIPP (e.g., step 318 in FIG. 3A). If all leads in the database have not been processed, the LHS loops back to step 602, and performs the lead association process for another lead. As WBUAA, more than one lead can be associated with each good/service, and each opportunity.

The OQSCP 400, OUSCP 500, and lead association process 600 discussed in connection with FIGS. 3A, 3B, 4, 5, and 6 are for exemplary purposes only; alternate embodiments are not limited to the specific sub-processes discussed herein. For example, in an alternate embodiment, functionalities of one or more of the aforementioned sub-process can be combined into a single or even multiple sub-process, possibly with other functionalities as will occur to one of ordinary skill in the art. An opportunity score calculation example will be now described next to provide better understanding of the various concepts discussed herein.

Opportunity Score Calculation Example

As described previously, aspects of the present disclosure are used to identify and score potential business opportunities for marketers, such that the marketers can elect to ration their time appropriately and pursue those opportunities that seem to have the highest chance at success (i.e., the opportunities with the highest scores). In one embodiment, scores in connection with business opportunities (equivalently, opportunity scores) are calculated by a specific LHS process, referred to herein as opportunity identification and prioritization process (OIPP) 300. As shown in FIGS. 3A and 3B, an exemplary OIPP can include a combination of two parallel processes, a first process corresponding to a "opportunity quality score calculation process (OQSCP)", and a second process corresponding to a "opportunity urgency score calculation process (OUSCP)". Specific method steps involved in the OQSCP and OUSCP are indicated in connection with FIGS. 4 and 5 respectively. A lead association process (shown exemplarily as a sub-process in the main OIPP) is discussed in connection with FIG. 6.

In an exemplary embodiment, the OQSCP 400 is generally associated with calculating a determined quality measure associated with a potential business opportunity. In the discussions that follow, for the sake of illustration, examples are provided wherein an opportunity relates to a lead 102. Therefore, in this example, an "opportunity quality" translates to a "lead quality", and "opportunity urgency" translates to "lead urgency". (In alternate LHS embodiments, opportunities may relate primarily to items of goods/services of a marketer 104 or other assets of a marketer, as shown exemplarily in FIGS. 10 and 12.) Examples of attributes that may indicate lead quality include a valid phone number, a valid email address, overall site activity, communication history via phone and email, and other attributes discussed below.

In one specific example, an "opportunity quality" relates to determining the best or most viable leads the marketer should address (e.g., those leads that are most likely to purchase goods/services of the marketers). In determining the best or most viable leads 102, the LHS 110 generally prioritizes those leads that are deemed to be of high quality. Although not shown specifically herein, it will be understood that according to one aspect of the present disclosure, after arriving at a marketer's website for the first time, leads 102 will typically go through a one-time lead registration process administered by the LHS 110. In one embodiment, during a registration process, leads provide information or preferences such as a desired frequency of receiving marketing communications from the marketer, types of marketing communications (e.g., email, phone call, text message, print mail, etc.) that are of interest to the respective lead, types of goods/services that the lead is interested in, specifics of such goods/services, budgets, and various other types of information. In several scenarios (such as in real estate marketing), leads might also provide a geographical area of interest, e.g., a street address/zip code, specific lifestyle (luxury, waterfront, historic, etc.), preferences, or other relevant information as applicable to a marketing campaign (if any) created by a marketer. Information provided by the leads is usually processed by the LHS so that the LHS can better serve the preferences and requirements of leads, and consequently provide them with relevant information, e.g., in the form of marketing communications. In some alternate aspects, marketers may call or even meet with leads in person in order to provide a more personalized experience to leads.

Once a lead is registered in the present system, many different lead quality attributes are used to assess the quality of the lead. Generally speaking, a lead quality component is a measure of the lead's interest in purchasing one or more items of goods/services from one or more marketers 104. For the sake of explanation and illustration, exemplary lead-specific aspects of opportunities will be described herein. However, it will be understood that various other lead-specific aspects can be involved in alternate embodiments of the presently disclosed system, are not limited to the ones discussed herein. Non-limiting examples of lead quality attributes utilized in assessing lead quality include:

- Quality of lead information—examples include valid emails and phone numbers. Leads who provide such information are generally deemed to be of a higher quality by the system.
- Lead qualification status—leads that have been contacted successfully by marketers, or that have been financially pre-approved, or have been tagged by marketers as more qualified than other leads are considered to be higher quality leads.
- Degree of focus on goods/services—leads that are searching for items of goods/services clustered within a particular geographic location or price, leads who have been viewing particular good/services multiple times, or who have bookmarked goods/services on a marketer's website as favorites are considered to be higher quality leads.
- Degree of search activity on marketer's website—leads that frequently access the marketer's website, leads that calculate financial loans (e.g., using embedded loan calculators on marketers' websites), leads that share information relating to specific goods/services with other persons (e.g., via email, etc.) are deemed to be higher quality leads.
- Relationship with marketer—leads who have a strong history of communication (e.g., several previous conversations via phone and/or email) with marketers tend to be higher quality leads.
- Interest in notifications from marketer's website—leads that are signed up to receive automatic updates from a marketer's website regarding updates in price and/or inventory of the marketers goods/services are considered to be higher quality leads.
- Potential value to marketer—leads that are interested in higher priced items of goods/services generally represent a higher ultimate value to the marketer and are deemed higher quality leads.

In one exemplary embodiment, a lead quality score is calculated by verifying whether or not various lead quality attributes are satisfied by a specific lead. Each lead quality attribute and the corresponding score assigned by the LHS 110 (or, equivalently OQSCP) is represented in the form of a business rule, as discussed previously in connection with FIG. 4. The following is a non-limiting example of points (or weights) that might be utilized by an OQSCP in a rule-based methodology (e.g., as discusses in steps 404 and 406 in FIG. 4) for calculation of lead quality score:

If a lead has valid phone number, assign 20 points to the lead quality score.
If a lead has valid email address, assign 20 points to the lead quality score.
If a lead is a "new lead", assign 15 points to the lead quality score.
If a lead is financially pre-approved, assign 15 points to the lead quality score.
If a lead's searches for a good/service are clustered within a particular price, assign 15 points to the lead quality score.
If a lead's searches for a good/service are clustered within a particular geographical location, assign 15 points to the lead quality score.
If a lead has reviewed at least three distinct items of goods/services at least three distinct time instants, assign 10 points to the lead quality score.
If a lead has bookmarked at least one item of good/service on a marketer's website as the lead's favorite, assign 10 points to the lead quality score.
If a lead has visited a marketer's website or place of business in the last 30 days, assign 10 points to the lead quality score.
If a lead has calculated a loan/mortgage payment for a particular item of good/service (such as an automobile, real estate property, electronic goods, etc.) in the last 30 days, assign 10 points to the lead quality score.
If a lead has printed at least one or more flyers from one or more marketers in the last 30 days, assign 5 points to the lead quality score.
If a lead has shared information relating to a marketers' goods/services with other persons (e.g. via email) at least once in the last 30 days, assign 5 points to the lead quality score.
If a lead has engaged in telephonic conference with a marketer at least twice, assign 5 points to the lead quality score.
If a lead has engaged in email communications with a marketer at least twice, assign 5 points to the lead quality score.
If a lead is subscribed to receive e-alert updates, assign 5 points to the lead quality score.

In one embodiment, a lead quality score for a particular lead 102 is calculated by summing up the points accumulated by executing each of the afore-mentioned exemplary rules (e.g., as shown in step 408 in FIG. 4). In one embodiment, if a lead's lead quality attribute does not satisfy a respective business rule, then zero (0) points are awarded to the lead quality score in connection with that respective business rule. (In alternate embodiments, a lead quality score for a particular lead is calculated by aggregating, analyzing, or performing some kind of a mathematical operation on the individual points accumulated by executing each business rule, e.g., as discussed above.)

Assuming a hypothetical lead satisfies the conditions associated with all of the above rules except the last two rules, then such a lead will have a lead quality score of 155 points. Usually, in one LHS embodiment, the lead quality score for a particular lead is standardized with respect to the pool of all other leads associated with the LHS 110, e.g., by deriving a percentile rank of the lead quality score. For example, if a lead quality score is evaluated to be in the 90th percentile, then this generally means that this lead quality score is higher than 89% of the other lead quality scores of the other leads associated with the LHS.

Next, the urgency score calculation process (OUSCP) (shown in FIG. 5) is used to calculate an opportunity urgency score. As mentioned previously, in one embodiment, triggering events are generally associated with monitoring interactions of leads (e.g., as discussed in FIGS. 7, 8, and 9) with the LHS, or non-activity of the leads with respect to the LHS, or some other triggering event. For example (and in one embodiment), the LHS monitors various goods/services for which a lead has expressed interested, whether or not a lead has bookmarked goods/services as favorites, and various other actions performed by leads. When a lead performs any action (exemplarily showed in FIGS. 7 and 9) in connection with a marketer's website as determined by the LHS, or performs some action as determined by other third party information services 158 (e.g., credit bureaus, banks, court records, market trend research agencies, etc.) the LHS system records such action and classifies the action into a predetermined "triggering event".

It will be understood that triggering events are not necessarily limited to leads. In other words, triggering events can also be associated with marketers and/or their offered goods/services. For example, a triggering event can be when a marketer takes an item of good/service off the market. In another example, a triggering event can be when a marketer updates the price or inventory information of goods/services. In the discussions that follow, for the sake of illustration, examples are provided wherein an opportunity relates to a lead. Therefore, in this example, an "opportunity urgency" translates to a "lead urgency". (In alternate LHS embodiments, opportunities can involve items of goods/services or other opportunities, as shown exemplarily in FIGS. 10 and 12.)

In one embodiment of the disclosed system, an "opportunity urgency" component is illustrative of a "when" component that is typically indicative of an urgency relating to an opportunity (e.g., when to contact a lead). In determining the urgency (equivalently, the urgency component in the overall opportunity score) in addressing a lead (or opportunity), the LHS generally prioritizes leads that are close to actually purchasing one or more items of goods/services from one or more marketers. An example of a lead urgency score is given below herein. The "when" component is typically driven by dynamic event triggering data attributes (e.g., as discussed in step 502 in FIG. 5). Non-limiting examples of such dynamic event triggering data attributes include:

Lead actions that indicate high interest in a particular item of good/services—a lead viewing a particular item on a marketer's site for at least a predetermined number of times over a given time interval (e.g., at least three (3) times in a given past week), a lead bookmarking on the marketer's website one or more goods/services as favorites of the lead, or calculating loan payments on financial loans, etc. are generally reflective of urgency to purchase a particular item of good/service.

Actions by first-time leads—a new lead who has just registered with the LHS, or a lead who hasn't been contacted yet are generally considered urgent leads.

Lead actions that indicate renewed or diminished home search interest—high activity of a lead on a marketer's website after a period of inactivity might indicate an urgent scenario.

Events relating to goods/services—events relating to changes in price/inventory changes are typically considered urgent as such events can be utilized by marketers as a reason to reach out to clients and prospective clients (i.e., leads). For instance, if there is a price reduction on a particular real estate property, an agent (marketer) can use this property event as an opportunity to reach out to high quality leads who have been looking for similar properties to make them aware of the event and potentially initiate an interest in taking additional steps towards purchasing the property.

Degree of interaction between marketer and leads—various factors associated with interaction between marketers and leads. For example, factors such as time since last telephone call to the lead, time since last email sent to the lead, a lead's preference for call opt in/out, and a lead's preference for email opt in/out. Thus, for instance, if a marketer spoke to the lead yesterday on the phone it may not be the most opportunistic time to call the lead yet again, and hence the lead may be considered less urgent.

In one exemplary embodiment, a rule-based methodology (e.g., as discussed in steps 510, 512, and 514) is applied to score these various dynamic event triggering data attributes. For example, a lead's visits to a marketer's website might be weighted at 0.1, a lead's views of items of goods/services offered by the marketer (e.g., via the marketer's website) might be weighted at 0.2, a lead's searches of items of goods/services offered by the marketer (e.g., via the marketer's website) might be 0.3, and a lead's favorites might be weighted at 0.4, etc. In a hypothetical scenario, if a lead in the last 30 days has accumulated 20 visits, 50 searches, 350 views, and 5 favorites (as recorded by the LHS), and, in the last 7 days, the lead has accumulated 17 visits, 45 searches, 300 views, and 5 favorites, then a lead urgency score is calculated as $17/20*0.1+45/50*0.2+300/350*0.3+5/5*0.4=0.762$ out of a possible 1.0.

In the example above, the number of visits/searches/views of a lead are accumulated over a predetermined time interval (e.g., past thirty days) and used to calculate a ratio over another predetermined time interval (e.g., past seven days). Such an example is provided for illustrative purposes only. That is because in the exemplary LHS embodiment discussed in this example, recent triggering events associated with a lead's urgency score affects the overall opportunity score more, as compared to the lead's past triggering events. In alternate embodiments, a total number of visits/searches/views of a lead (e.g., accumulated since a lead registered on a marketer's website) can be used to calculate an opportunity urgency score, i.e., a ratio may not be calculated.

Further, in one embodiment, the lead quality score (e.g., calculated by the OQSCP) and the lead urgency score (e.g., calculated by the OUSCP) are combined according to a predefined algorithm (e.g., as discussed in FIG. 3A). This combination of lead quality score and lead urgency score is used to generate an overall opportunity score for every respective opportunity (shown exemplarily in FIG. 8). Finally, and in one embodiment, the respective opportunities (e.g., comprising leads and associated goods/services) are ranked based on their overall score, and sorted as a list of prioritized opportunities/tasks (shown exemplarily in FIG. 10). In one example, this list of prioritized opportunities/tasks is dynamically updated at periodic intervals of time (e.g., every 10 minutes, every 30 minutes, or some other predetermined time interval), wherein the opportunity quality score is evaluated (for example) on a daily or hourly basis, whereas the opportunity urgency score is calculated based on the occurrence of predetermined "triggering events".

Reverting back to the discussion example, assuming that a lead quality score for a specific lead was in the top $40^{th}$ percentile (i.e., assuming the pre-existing threshold criteria is satisfied), the lead qualifies as an opportunity and is assigned an overall score of 0.762 (according to the example as described previously herein). However, in some LHS embodiments, if the pre-existing threshold criteria is not satisfied by an opportunity (either a lead or a good/service), the opportunity is generally not included in the prioritized list of opportunities/tasks. It will appear that in the example above, the overall opportunity score equals the opportunity urgency score, if the opportunity quality score satisfies one or more predetermined criteria. In alternate LHS embodiments however, the opportunity quality score and the opportunity urgency sore can be combined according to any predefined mathematical or logical combination.

In many scenarios, the "value" of an opportunity can decay with time. For instance, when a new lead 102 registers on a marketer's website, an opportunity window for reaching out and contacting the lead 102 may be very short. In addition, marketers 104 (or their employees) could choose to be alerted via email or text when particular types of opportunities to the top of the list (e.g., opportunities that were deemed more important than other types) to facilitate better interactions with leads. For instance, a real estate agent could be emailed when one of his/her leads just viewed a particular property for the $4^{th}$ time on the site in order to quickly contact the lead to see if he/she wants more information about the property or wants to see it in person. Therefore, in other words, based on the type of opportunity, the overall score of an opportunity can decay with time, depending on how time-sensitive the opportunity is. If it assumed that the lead urgency score for a particular opportunity type decays at a rate of 25% per day, the overall score would then be re-prioritized accordingly.

Typically, and in one embodiment, the decay is calculated in the form of pre-determined business rules associated with the OUSCP (or, the OQSCP). For example, such pre-determined business rules for decaying opportunities are managed by sweeping through a datatable (e.g., as shown in FIG. 7 and stored in a LHS database) indicating lead interactions with a marketer's website and identifying any events for which the opportune time to act has expired. As a result, the urgency-related components are adjusted and hence the overall scores of corresponding opportunities might change accordingly. In another embodiment, such pre-determined business rules associated with the decay are executed at predetermined intervals of time.

In various LHS embodiments, a list of prioritized opportunities/tasks could be based on all (or a subset) of the marketer's opportunities or based on those opportunities that are specific to a particular good or service. For example, in a real estate marketing scenario, a marketer (e.g., a real estate agent or broker) can see the top opportunities/tasks associated with a specific real estate property. In other embodiments, opportunities could be limited to specific subsets of leads.

Although in the example above the opportunity score calculation involves both a lead quality score and also a lead urgency score, alternate LHS embodiments of the LHS can include only the lead quality score, or only the lead urgency score exclusively (e.g., as shown in FIG. 3A). In other LHS embodiments, a lead quality score and a lead urgency score can be combined in different ways, as will occur to one skilled in the art.

As mentioned previously, in one embodiment, a list of prioritized opportunities corresponds to a snapshot of the proactive opportunities of a marketer at a particular time instant (e.g., as shown in FIG. 10). Such displayed opportunities can pertain to leads only, items of goods/services only, a combination of both, or some other marketer-related criteria. In one exemplary aspect, the top ten (10) opportunities are displayed to a marketer (e.g., via his mobile device screen). In alternate aspects, any number of opportunities can be displayed to marketers.

Further, in other aspects, for each opportunity the LHS 110 provides contextual information (e.g., as shown in FIGS. 11 and 12) relating to a lead and a corresponding triggering event (or events) associated with the lead. For example, such contextual information can be displayed to marketers via a popup window, a user widget, a clickable link, or any other digital user interface control as will occur to one skilled in the art. In some scenarios, numerical counters placed at the top of a list display a respective number of opportunities dismissed, ignored, or addressed by a marketer on a particular day. Because the lead profile can be updated and/or one or more triggering events associated with the lead can occur at any time, the list of opportunities/tasks is generally dynamically updated at periodic intervals of time (e.g. every 10 minutes, every 30 minutes, or some other predetermined time interval). Data base schemas illustrating details of lead interactions with a marketer's website, and various other LHS database details will be better understood from the discussions that follow.

Referring to FIG. 7, an exemplary lead action database schema 710 illustrating information relating to different action(s) taken by leads is shown. As described previously, such actions are used to determine whether or not one or more opportunities might exist for the given lead. As shown in FIG. 7, schema 710 in one exemplary embodiment comprises a Lead ID column 720, an Action Name column 730, an Action Date column 740, and an Action Context column 750. The Lead ID column 720 uniquely identifies a lead who is registered with the LHS. The Action Name column 730 identifies an unique action taken by a lead on a date specified in the Action Date column 740. Also, the associated details for the action taken by a lead is provided in Action Context column 750.

For example, a first entry in schema 710 indicates that a lead having Lead ID 574 has viewed on Sep. 30, 2012 one or more goods/services on a marketer's website. In other words, the Action Context of the lead is related to a good/service having a good/service ID 24, wherein the action taken by the lead occurred via a mobile device with source IP address 10.1.2.25. Thus, it will be understood that embodiments of the present LHS 110 can track various attributes associated with lead actions, e.g., whether the lead is accessing a marketer's database via a mobile or a desktop, source IP address, geographical location of the lead, and various other attributes. The columns and their respective values shown in FIG. 7 are for exemplary purposes only. Various other columns and values can be included in alternate embodiments of the LHS.

Now turning to FIG. 8, an exemplary opportunity table database schema 810 is shown illustrating (business) opportunities and associated concepts in connection with one embodiment of the LHS. In one embodiment, exemplary opportunity table database schema 810 is used to create a snapshot of the proactive opportunities of a marketer at a particular time instant, such as the one displayed in FIG. 10. As shown in FIG. 8, in one exemplary embodiment, database schema 810 comprises a Time Stamp column 820, an Opportunity ID column 830, an Opportunity Type ID column 840, a Lead ID column 720, a G/S ID column 850, a Marketer ID column 860, a Quality Score column 870, an Urgency Score column 880, and an Overall Opportunity Score column 890. The Time Stamp column 820 indicates a time stamp when the opportunity table database schema 810 was last modified (for each given opportunity). Opportunity ID column 830 uniquely identifies every opportunity (lead-based or good/services-based) in connection with the LHS. In one LHS embodiment, opportunity types are pre-classified as belonging to a specific type. Thus, the Opportunity Type ID 840 functions as a lookup column for a specific type of opportunity. Additional details of opportunity types will be discussed in connection with FIG. 9. As mentioned previously in connection with FIG. 7, the Lead ID column 720 uniquely identifies a lead who is registered with the LHS ad is associated with the given opportunity. In many scenarios, an opportunity may not be linked to a lead. For example, a good/service that has recently been introduced might not have been viewed by any lead. In such scenarios, the entry in the Lead ID column for the respective good/service is indicated as "null".

The G/S ID column 850 indicates one or more good/services associated with the given opportunity. Further, in many scenarios, an opportunity might not be tied to a specific good/service. For example, registration of a new lead with the LHS might indicate an opportunity to contact the given lead, but may be unrelated to any specific good or service. In such scenarios, the LHS associates a "null" G/S ID with the respective opportunity. The Marketer ID column 860 specifies a marketer associated with the opportunity uniquely identified in the Opportunity ID column 830. As discussed herein, in one embodiment, LHS opportunities are identified as having a quality-related score component and an urgency-related score component. Thus, the opportunity quality-related score component is specified in Quality Score column 870, the opportunity urgency-related score component is specified in Urgency Score column 880, and the overall opportunity score (e.g., generated by combining the two above-mentioned components) is specified in the Overall Opportunity Score column 890.

As shown, a first entry in database schema 810 indicates that at 10:30 AM on Sep. 30, 2012, an opportunity with Opportunity ID 10 (that is identified as Opportunity Type ID 3) is associated with a lead having a Lead ID 52 and a G/S ID 19 offered by a marketer having a Marketer ID 1. Also, the quality score for the opportunity is 155, the urgency score is 0.8, and the overall opportunity score is 0.9. As discussed previously, the overall opportunity score is used to rank a list of marketer's opportunities, e.g., displayed via an opportunity wall as shown in FIG. 10.

It is exemplarily shown in FIG. 8 that the individual quality scores and urgency scores can have little or no relationship with each other. For example, one score can be higher than the other or vice-versa, both scores can be high, or alternately both scores can be low. Consequently, according to LHS aspects, the overall opportunity score is affected.

Now turning to FIG. 9, an exemplary opportunity type table database schema 910 is shown illustrating aspects of LHS classification of opportunity types. As shown in FIG. 9, database schema 910 comprises an Opportunity Type ID column 840 and a Template Text column 920. The Opportunity Type ID column 840 uniquely identifies every opportunity (lead-based or good/services-based) in connection with the LHS 110. The Template Text column 920 provides additional details associated with a respective Opportunity Type ID. For example, it is shown that Opportunity Type ID 3 corresponds to a property tagged by {property name} has been favorited at a time tagged by {time}. Similarly, Opportunity Type ID 15 corresponds to a marketer's website tagged as {marketer site} has been viewed three times by a lead 102 tagged as {lead id}. It will occur to one skilled in the art that tags (shown enclosed within curly braces in FIG. 9) are special character strings that act as individually customizable containers for variable data.

Now referring to FIG. 10, a list of opportunities (also referred to herein as an opportunity wall 150) is shown as displayed to a marketer via an interface of a computing device, in the context of a real estate marketing scenario. In one embodiment, information in the exemplary database schemas shown in FIGS. 7, 8, and 8 is used by the LHS to create the opportunity type table database schema 910. As shown in FIG. 10 and in one embodiment, the opportunities are dynamically ranked in real-time and prioritized with the highest ranked opportunity (i.e., that warrants immediate attention of the marketer) at the top. In addition to the opportunities themselves, a brief description of the last dynamic event triggering attribute (or attributes) associated with a respective opportunity is also shown. Various opportunities are shown in FIG. 10 along with their respective ranks.

The highest ranked opportunity (shown in region 1000 in FIG. 10) is in connection with a lead called "Heidi Symms" who has just (i.e., 3 minutes ago) registered with the LHS 110 and is searching for real estate property in Charleston. Thus, it will be understood that according to aspects as disclosed herein, leads (e.g., a first time lead such as "Heidi Symms") do not necessarily have to be linked with a good/service. Such leads are still considered as potential opportunities, and scored/ranked by the LHS. This lead is considered highly urgent because she just registered with a LHS a few minutes ago, and is likely currently looking for goods/services on the marketer's website.

In another example shown in region 1002 (and based on a LHS updated information seven minutes ago), a second highest ranked opportunity called "Charles Harkins" is shown. This opportunity indicates high interest by lead Charles Harkins in a property on Sullivan's Island. This opportunity was determined based on satisfaction of rules relating to the lead's "favoriting" of the good/service, and also viewing information relating to the good/service 3 times.

As mentioned previously, a lead 102 that has been non-active for some time but shows a spike in activity (e.g., by multiple visits to a marketer's website) might indicate the lead's renewed interest in a particular product or service, and this may be a potential business opportunity for a marketer's consideration. Such an example is shown in region 1004, a third ranked lead-based opportunity called "Kathleen Askins" She has been searching for real estate property in Mount Pleasant, Charleston. It is further revealed on this interface that the lead Kathleen Atkins (referred to as prospect in the opportunity wall interface) was called by a respective marketer 29 minutes ago. This shows that the marketer took some action with regard to this lead. Thus, in LHS embodiments, actions that can be taken are specified to marketers. Additionally, actions that have already been specified by marketers are also specified on the opportunity wall interface.

Region 1004 also indicates that based on a LHS updated information thirty nine minutes ago the lead has made five searches, and has also made thirty five views of one or more real estate properties in the last two days.

In region 1006 in FIG. 10, an opportunity is shown that relates to a good/service, e.g., a real estate property. Specifically, the fourth ranked opportunity in opportunity wall 150 is called "PROPERTY AT 123 SMITH STREET, CHARLESTON 29460". Further, it is also shown that this property has been favorited and viewed twice in the last hour.

In many scenarios, a marketer (e.g., a real estate broker or agent) might wish to obtain additional information in connection with a displayed opportunity. Thus, in several LHS embodiments, marketers can click on a displayed opportunity and obtain such information, as discussed next in FIGS. 11 and 12.

Now referring to FIG. 11, a screenshot is shown of an exemplary LHS marketer interface 1002 displaying additional details relating to a hypothetical prioritized lead-based opportunity. For example, in FIG. 11, additional details relating to an opportunity called "Charles Harkins" (ranked and displayed previously in region 1002 in connection with FIG. 10) is shown. Various exemplary details of the lead (e.g., name, email, phone number, address, when the lead registered with the LHS, preferred budget, if and when the lead calculated a mortgage payment on a good/service, etc.) as well as those relating to the specific good/service are shown. Exemplary details relating to the specific good/service might include a miniature picture/thumbnail of the goods/services in which the lead has shown interest, dates/times when the lead has shown interest, specifics of the good/service including any event triggering attributes (such as price changes), and the like. It will be understood and appreciated by one skilled in the art that various other informational attributes (information from lead profile, a list of event triggering attributes in connection with the lead, the lead quality score, the lead urgency score, etc.) can be displayed in connection with additional details relating to an opportunity.

Now referring to FIG. 12, a screenshot is shown of an exemplary LHS marketer interface 1006 displaying additional details relating to a hypothetical prioritized non-lead-based (or, equivalently, good/service-based) opportunity. For example, in FIG. 12, additional details relating to an opportunity called "PROPERTY AT 123 SMITH STREET, CHARLESTON 29460" (ranked fourth in the list of opportunities and displayed previously in region 1006 in connection with FIG. 10) is shown. Various listing details relating to this property are indicated. That is, this property has 5 bedrooms, 3 bathrooms; has an area of 5000 sq. ft.; has been on the market for 2 days; and is priced at $500,000. Additionally, details of various leads who have shown interest in this property are also indicated. For example, a lead called "Danielle Troutman" favorited this property one hour ago. Furthermore, an unknown lead (e.g., an unregistered lead) viewed this property on Sep. 30, 2012 at 5:30 PM. Also, a lead called "Jill Harris" viewed this property on Oct. 1, 2012 at 11:30 AM. It is also shown that a marketer can choose to view additional details relating to the leads "Danielle Troutman" and "Jill Harris" by clicking on the button "Open Lead Details".

The exemplary screenshots in connection with FIGS. 10-12 are for illustrative purposes only. In other words, although in FIGS. 10-12 the opportunities shown relate primarily to leads and goods/services, in alternate LHS embodiments opportunities can relate to some other business possibility (e.g., a football game, a soccer match, a venue, an event at a bar or a restaurant, etc.). Further, there can be alternate ways in which the LHS marketer interface can be designed, e.g., with different buttons, menu bars, tabs, informational content, and other interface features, as will occur to one skilled in the art. In one exemplary embodiment, marketers can contact leads directly from the opportunity wall interface, e.g., by clicking on an email button or phone call button displayed within menu bar 1010 in FIGS. 10 and 11.

From the foregoing discussions, it will be understood that aspects of the present disclosure generally relate to systems and methods for facilitating identification and prioritization of opportunities for marketers of goods and services. In one embodiment, the opportunities relate to business opportunities that a marketer can pursue. For example, an opportunity might be the identification of a particular consumer ("lead") that is interested in a good or service marketed by the marketer, as determined based on the lead's actions indicating such interest. These actions may be identified based on the consumer's online activity, communications or responses to traditional communication mechanisms, social media interactions, past purchases of similar items, etc. Such identification and prioritization of opportunities generally enables the respective marketer to maximize his or her time by pursuing those opportunities that are most urgent and/or are most likely to result in sales of goods and services. According to one aspect of the disclosed system, upon identification of one or more opportunities for a marketer, the opportunities are scored and ranked based upon predetermined quality attributes, urgency attributes, and other information, and are presented to the marketer to take action (if desired).

On the basis of the foregoing discussions, it will be understood that systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method for identifying and managing real estate opportunities via a lead handling computer system (LHS), wherein the LHS is in operative communications with a plurality of real estate professionals and a plurality of real estate leads, the method comprising the steps of:

receiving lead quality information at the LHS corresponding to a particular real estate lead;

applying a predetermined lead quality business rule via the LHS to the received lead quality information to determine a lead quality score for the particular real estate lead;

upon determination that the lead quality score for the particular real estate lead satisfies a preexisting lead quality threshold value, receiving urgency information indicating one or more actions taken by the particular real estate lead with respect to one or more real estate properties being offered by a particular real estate professional, the one or more actions taken by the particular real estate lead including accessing a webpage associated with the particular real estate professional within a predefined time period, the webpage providing information relating to the one or more real estate properties being offered by the particular real estate professional;

determining via the LHS whether the urgency information indicating the one or more actions taken by the particular real estate lead satisfies a predetermined lead urgency business rule corresponding to a real estate opportunity for the particular real estate professional relating to the one or more real estate properties being offered by the particular real estate professional;

upon determination that the urgency information satisfies the predetermined lead urgency business rule corresponding to the real estate opportunity for the particular real estate professional, generating via the LHS an opportunity score for the real estate opportunity based on the or more actions taken by the particular real estate lead;

transmitting information corresponding to the real estate opportunity for the particular real estate professional from the LHS to a computing device of the particular real estate professional; and presenting in real time the information corresponding to the real estate opportunity on the computing device of the particular real estate professional as part of a dynamically updating live feed of real estate opportunities that are ranked based on a comparison of the generated opportunity score for the real estate opportunity to previous opportunity scores corresponding to previous real estate opportunities of the particular real estate professional for subsequent action by the particular real estate professional.

2. The method of claim 1, wherein the lead quality information is indicative of the particular real estate lead's ability to purchase the one or more real estate properties being offered by the particular real estate professional.

3. The method of claim 1, wherein the lead quality information is indicative of the particular real estate lead's overall interest in the one or more real estate properties being offered by the particular real estate professional.

4. The method of claim 1, the one or more actions taken by the particular real estate lead including one or more of the following: registering with the LHS, physically visiting a geographical location associated with the one or more real estate properties being offered by the particular real estate professional, contacting the particular real estate professional directly, sharing information about the one or more real estate properties on a social media page, requesting information about the one or more real estate properties, offering to purchase the one or more real estate properties, designating the one or more real estate properties as a favorite, bookmarking the one or more real estate properties.

5. The method of claim 1, wherein the step of generating via the LHS the opportunity score further comprises the steps of:

weighting each of the one or more actions taken by the particular real estate lead;
aggregating the weighted actions;
applying the aggregated weighted actions to one or more predetermined opportunity rules; and
generating the opportunity score based on the weighted actions.

6. The method of claim 1, wherein the real estate opportunity comprises one or more of the following: information about the particular real estate lead, information about the one or more actions taken by the particular real estate lead with respect to the one or more real estate properties being offered by the particular real estate professional, information relating to the one or more real estate properties being offered by the particular real estate professional, contact information for the particular real estate lead, time information indicating when the one or more actions taken by the particular real estate lead occurred, communication history information between the particular real estate lead and the particular real estate professional, a communication mechanism to contact the particular real estate lead directly from a computing device of the particular real estate professional.

7. The method of claim 1, wherein the step of presenting in real time the information corresponding to the real estate opportunity on the computing device of the particular real estate professional is selected from the group comprising: displaying information relating to the real estate opportunity on an interface of the computing device of the particular real estate professional, emailing information relating to the real estate opportunity to the particular real estate professional, sending an SMS or MMS message including information relating to the real estate opportunity to the particular real estate professional, notifying the particular real estate professional via an alert mechanism.

8. The method of claim 1, wherein the subsequent action taken by the particular real estate professional comprises contacting the particular real estate lead regarding purchase of the one or more real estate opportunities being offered by the particular real estate professional.

9. The method of claim 1, further comprising the step of determining that the generated opportunity score satisfies a preexisting threshold criteria.

10. The method of claim 1, wherein the particular real estate professional comprises one or more of: real estate agent, realtor, real estate broker, commercial broker.

11. The method of claim 1, wherein the one or more actions taken by the particular real estate lead indicate an activity spike on the part of the particular real estate lead.

12. The method of claim 4, wherein contacting the particular real estate professionally directly comprises one or more of: calling the particular real estate professional, emailing the particular real estate professional, sending an SMS or MMS message to the particular real estate professional.

13. A method for identifying and managing real estate opportunities via a lead handling computer system (LHS), wherein the LHS is in operative communications with a plurality of real estate professionals and a plurality of real estate leads, the method comprising the steps of:

receiving lead quality information at the LHS corresponding to a particular real estate lead;
applying a predetermined lead quality business rule via the LHS to the received lead quality information to determine a lead quality score for the particular real estate lead;
upon determination that the lead quality score for the particular real estate lead satisfies a preexisting lead quality threshold value, receiving urgency information indicating internet-based activity occurring within a predetermined time period by the particular real estate lead, wherein the internet-based activity is associated with one or more properties being offered by a particular real estate professional;
determining via the LHS whether the urgency information indicating internet-based activity by the particular real estate lead satisfies a predetermined lead urgency business rule corresponding to a real estate opportunity for the particular real estate professional relating to the one or more real estate properties being offered by the particular real estate professional;

upon determination that the urgency information satisfies the predetermined lead urgency business rule corresponding to the real estate opportunity for the particular real estate professional, generating via the LHS an opportunity score for the real estate opportunity based on the internet-based activity by the particular real estate lead;

transmitting information corresponding to the real estate opportunity for the particular real estate professional from the LHS to a computing device of the particular real estate professional; and presenting in real time the information corresponding to the real estate opportunity on the computing device of the particular real estate professional as part of a dynamically updating live feed of real estate opportunities that are ranked based on a comparison of the generated opportunity score for the real estate opportunity to previous opportunity scores corresponding to previous real estate opportunities of the particular real estate professional for subsequent action by the particular real estate professional.

14. The method of claim 13, the internet-based activity by the particular real estate lead including one or more of the following: accessing a webpage associated with the particular real estate professional and providing information relating to one or more real estate properties being offered by the particular real estate professional, contacting the particular real estate professional directly, sharing information about the one or more real estate properties on a social media page, requesting information about the one or more real estate properties, offering to purchase the one or more real estate properties, designating the one or more real estate properties as a favorite, bookmarking the one or more real estate properties.

* * * * *